United States Patent [19]
Ram et al.

[11] Patent Number: 6,103,351
[45] Date of Patent: Aug. 15, 2000

[54] TIME AND TEMPERATURE INTEGRATING INDICATOR DEVICE

[75] Inventors: Arunachalam T. Ram; Joseph A. Manico, both of Rochester; Kathleen R. Gisser, Pittsford; Peter J. Cowdery-Corvan, Webster; Thomas D. Weaver, Rochester, all of N.Y.

[73] Assignee: Eastman Kodak Company, Rochester, N.Y.

[21] Appl. No.: 09/050,722

[22] Filed: Mar. 30, 1998

Related U.S. Application Data

[63] Continuation-in-part of application No. 08/987,662, Dec. 9, 1997, abandoned.

[51] Int. Cl.$^7$ .............................. B32B 3/00; B32B 27/14
[52] U.S. Cl. ........................ 428/195; 374/102; 374/162; 116/219; 426/88
[58] Field of Search ...................... 374/102, 103, 374/162; 116/219; 426/88; 436/2; 428/195

[56] References Cited

U.S. PATENT DOCUMENTS

| | | | |
|---|---|---|---|
| 3,344,670 | 10/1967 | Olsen et al. | 73/356 |
| 3,999,946 | 12/1976 | Patel et al. | 23/253 TP |
| 4,382,700 | 5/1983 | Youngren | 374/102 |
| 4,384,780 | 5/1983 | Bresson | 354/288 |
| 4,469,423 | 9/1984 | Bresson | 354/288 |
| 4,735,745 | 4/1988 | Preziosi et al. | 252/408.1 |
| 4,737,463 | 4/1988 | Bhattacharjee et al. | 436/2 |
| 4,812,053 | 3/1989 | Bhattacharjee | 374/102 |
| 4,892,677 | 1/1990 | Preziosi et al. | 252/408.1 |
| 4,917,503 | 4/1990 | Bhattacharjee | 374/102 |
| 5,053,339 | 10/1991 | Patel | 436/2 |
| 5,057,434 | 10/1991 | Prusik et al. | 436/2 |
| 5,085,801 | 2/1992 | Thierry et al. | 252/408.1 |
| 5,120,137 | 6/1992 | Ou-Yang | 374/106 |
| 5,285,227 | 2/1994 | Lawther et al. | 354/275 |
| 5,306,466 | 4/1994 | Goldsmith | 422/58 |
| 5,499,597 | 3/1996 | Kronberg | 116/216 |
| 5,573,995 | 11/1996 | Janssens et al. | 503/201 |
| 5,667,303 | 9/1997 | Arens et al. | 374/102 |
| 5,734,411 | 3/1998 | Michielsen et al. | 347/186 |
| 5,756,356 | 5/1998 | Yanagi et al. | 436/7 |

FOREIGN PATENT DOCUMENTS

| | | |
|---|---|---|
| 1228232 | 4/1971 | United Kingdom . |
| 96/28714 | 3/1996 | WIPO . |

OTHER PUBLICATIONS

"3M Monitor Mark™ Product Exposure Indicators" Technical Report, 1995.
"3M Monitor Mark™ High Temperature Labels" Data Page for High Temperature Labels 34AA and 42AA, 1995.
"Telatemp Custom Temperature Labels" and "Telatemp Irreversible Temperature Labels" data sheets.

*Primary Examiner*—William Krynski
*Assistant Examiner*—B. Shewareged
*Attorney, Agent, or Firm*—Andrew J. Anderson

[57] ABSTRACT

Time and temperature integrating devices for providing a visually observable indication of cumulative thermal exposure are disclosed comprising (a) a substrate having thereon a thermally sensitive image-forming area comprising a combination of (i) an organic silver salt oxidizing agent and (ii) a reducing agent for the organic silver salt oxidizing agent, and (b) indicating indicia in association with the image forming area for indicating when the device has been exposed to a predetermined cumulative thermal exposure. In accordance with further embodiments of the invention, a process of applying such a device to a perishable product, and a perishable product having such a device applied directly thereto or to packaging thereof, are also disclosed. Time-temperature indicators in accordance with the invention undergo readily detectable changes can be easily optimized to match various rates of time-temperature dependent cumulative changes desired to be monitored for various products.

26 Claims, 6 Drawing Sheets

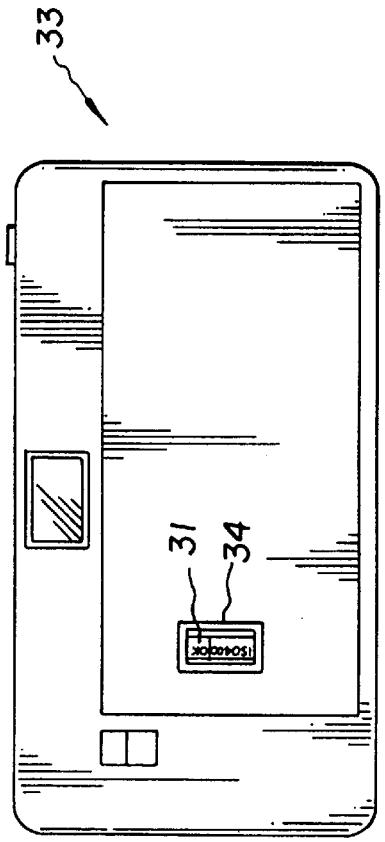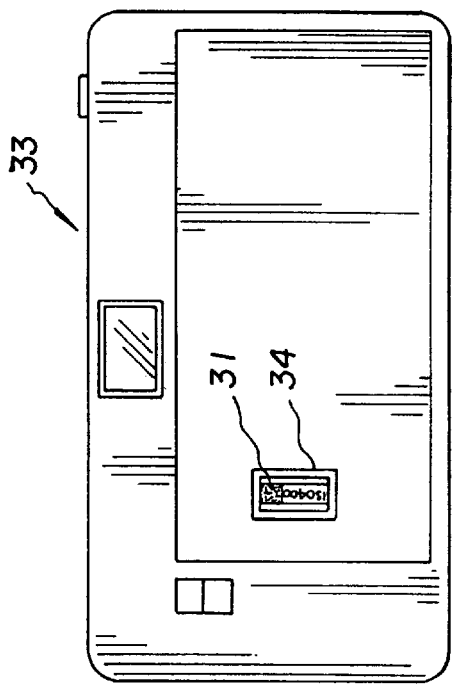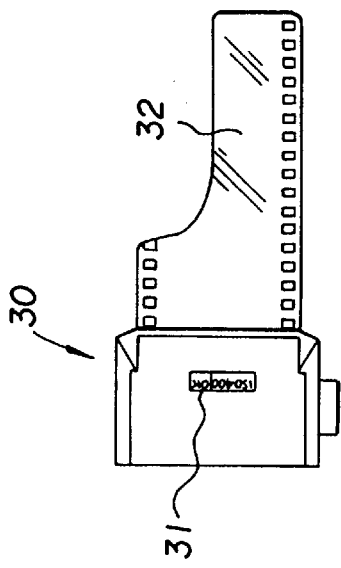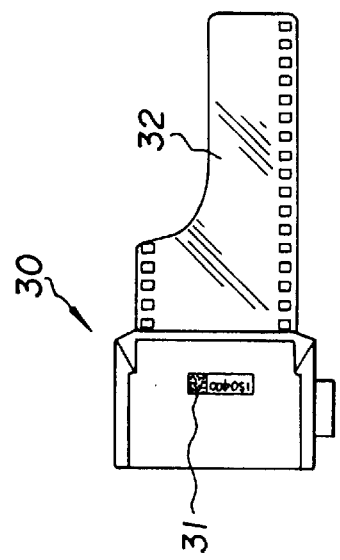

TIME AND TEMPERATURE INTEGRATING INDICATOR DEVICE

CROSS REFERENCE TO RELATED APPLICATION

This application is a continuation-in-part of U.S. Ser. No. 08/987,662, filed Dec. 9, 1997, abandoned, the disclosure of which is incorporated herein by reference in its entirety.

FIELD OF THE INVENTION

This invention relates in general to devices for indicating integrated time and temperature exposures. In particular, this invention relates to such devices which comprise a thermally sensitive image-forming area which comprises a thermographic or photothermographic composition.

BACKGROUND OF THE INVENTION

It is frequently desirable to be able to provide an indication whether a product has been exposed to an undesirable time-temperature history which results in substantial degradation of the product, or to a correct time-temperature history which may be required during processing or use of the product. This applies, e.g., to perishables such as foods, pharmaceuticals, and photographic products, which generally have limited useful lifespans which may be significantly shortened by exposure to undesirably relative high temperatures for a specific time period during storage, distribution, or use. This also applies, e.g., to certain products such as canned goods and biomedical materials which may be required to be held at certain high temperatures for a specific time period, e.g. to guarantee sterilization.

The rate of degradation, or other change in a product, at a given temperature is typically product dependent, i.e. some types of products show a greater increase in the rate of change for a given temperature increase relative to other products. Accordingly, it would be desirable to be able to provide indicators for use with various products which supply a visual indication of cumulative thermal exposure in which the rate of providing the visual indication of cumulative thermal exposure can be approximately matched to the rate of cumulative change, such as degradation, of the specific product to be monitored.

A number of systems have been described for providing indicators useful in detecting whether a product has been exposed either to specific time-temperature combinations or simply to a particular temperature which results in substantial degradation. Representative systems are disclosed, e.g., in U.S. Pat. No. 3,999,946 (use of compositions containing at least two conjugated acetylene groups which exhibit sequences of irreversible color changes at combinations of times and temperatures specific to each composition) and WO 96/28714 (use of viscoelastic material which migrates into a diffusely light-reflective porous matrix at a rate which varies with temperature to progressively change the light transmissivity of the porous matrix). A drawback of many of the indicators described in the prior art, however, is that they may frequently be useful only over a very limited temperature range, that they may not be easily designed to match the rate of cumulative change desired to be monitored for a particular product, that they may be bulky or expensive, that they may require cumbersome manual activation steps, or that they may depend upon diffusion or complex reaction mechanisms for their operation.

PROBLEM TO BE SOLVED BY THE INVENTION

Accordingly, it would be desirable to provide a new class of time-temperature indicators which undergo readily detectable changes which correspond to the progressive development of time-temperature exposure history. It would be especially desirable to provide such indicators which can be easily optimized to match various rates of time-temperature dependent cumulative changes desired to be monitored for various products.

SUMMARY OF THE INVENTION

In accordance with one embodiment of the invention, a time and temperature integrating device for providing a visually observable indication of cumulative thermal exposure is disclosed comprising (a) a substrate having thereon a thermally sensitive image-forming area comprising a combination of (i) an organic silver salt oxidizing agent and (ii) a reducing agent for the organic silver salt oxidizing agent, and (b) indicating indicia in association with the image forming area for indicating when the device has been exposed to a predetermined cumulative thermal exposure. In accordance with further embodiments of the invention, a process of applying such a device to a perishable product, and a perishable product having such a device applied directly thereto or to packaging thereof, are also disclosed.

BRIEF DESCRIPTION OF THE DRAWINGS

FIGS. 3a and 3c illustrate an indicator device on a film cartridge.

FIGS. 3b and 3d illustrate an indicator device visible through a "film type" window on a photographic camera back.

DESCRIPTION OF THE PREFERRED EMBODIMENTS

The time and temperature integrating devices in accordance with the invention comprise a support having thereon a thermally sensitive image-forming area composition comprising a combination of (i) an organic silver salt oxidizing agent and (ii) a reducing agent for the organic silver salt oxidizing agent. Such thermally sensitive compositions in accordance with the time-temperature history indicators of the invention may comprise components of thermally sensitive compositions typically used in conventional thermally processable imaging elements. Such imaging elements, including films and papers, for producing images by thermal processing are well known. These elements include thermographic elements in which an image is formed by imagewise heating the element, as well as photothermographic elements in which an image is formed by imagewise exposure of the element to light followed by development by uniformly heating the element. Such imaging elements are described in, for example, Research Disclosure, June 1978, Item No. 17029 and U.S. Pat. Nos. 3,080,254, 3,457,075 and 3,933,508. Research Disclosure is published by Kenneth Mason Publications, Ltd., Dudley House, 12 North St., Emsworth, Hampshire P010 7DQ, England. The thermographic and photothermographic elements typically comprise essentially transparent thermally sensitive silver salt compositions coated on a support, which compositions form a visible image of increasing density with increasing thermal exposure.

While the thermal sensitivity of thermographic and photothermographic compositions is well known, it has not been previously suggested to use such compositions in association with indicating indicia in a time and temperature integrating indicator device. To the contrary, photothermographic imaging elements are typically heated at relatively high temperatures for relatively short periods of time to reach maximum density after an imagewise exposure (e.g., temperature within the range of about 90° C. to 180° C. for about 0.5 to about 60 seconds). At lower temperatures, the time required for complete image development may be extended for weeks or months or even longer, depending upon the reactivity of the thermographic or photothermographic composition. The use of the thermally sensitive composition in accordance with the time and temperature integrating devices of the instant invention takes advantage of the ability to control the reactivity of thermographic and photothermographic formulations in order to correlate such reactivity to the known time and temperature sensitivity of a given perishable product in preferred embodiments of the invention. Such compositions may be formulated to demonstrate a range of visible density increases corresponding to relatively longer periods of exposures at relatively lower temperatures than previously used for development in a conventional thermographic or photothermographic imaging element.

Figure 1:
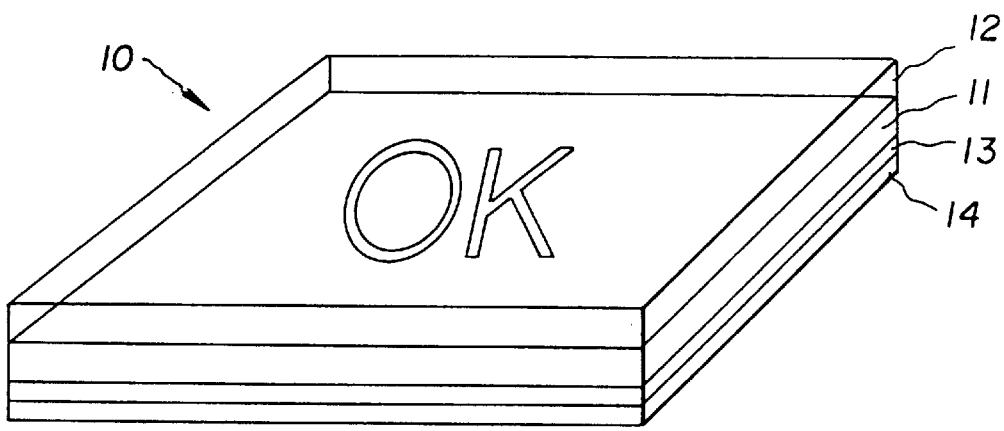
FIG. 1 illustrates a time and temperature integrating indicator device in accordance with one embodiment of the invention.
Figure 2A:
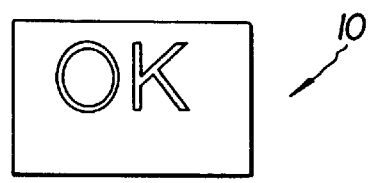
FIG. 2a represents an indicator device in "fresh" state, having been exposed to no "high temperature" exposure.
Figure 2B:
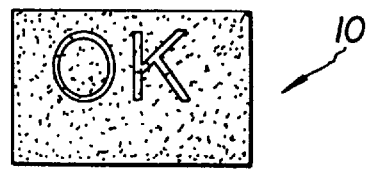
FIGS. 2b–2d represent the same device upon "high temperature" exposures for progressively extended periods of time.
Figure 2C:
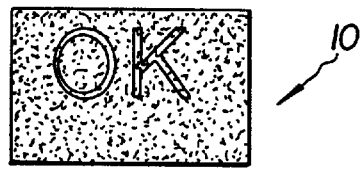
Figure 2D:
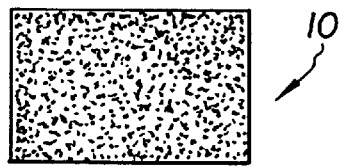

Indicating indicia for use in accordance with the invention may comprise letters or graphics printed on the device which become obscured by an image formed by the thermally sensitive composition when the device has been exposed to a sufficient cumulative thermal exposure. In accordance with one embodiment of the invention, a time and temperature integrating indicator device 10 may be created by coating a support 11 printed with indicia such as "GOOD", "FRESH", or "OK" with a transparent thermally sensitive composition layer 12 as indicated in FIG. 1. As the device is exposed to sufficiently high temperatures over sufficient periods of time, a thermographic reaction takes place and the composition begins to darken, obscuring the indicia as illustrated in FIGS. 2a–2d. FIG. 2a represents a device in "fresh" state, having been exposed to no "high temperature" exposure, while FIGS. 2b–2d represent the same device upon "high temperature" exposures for progressively extended periods of time. The change in visual density may be correlated to known time and temperature integrated exposures, thus providing an indication of the time and temperature history of a perishable product to which the device has been attached. Alternatively, the thermally sensitive composition may be coated on a transparent support, and the device directly overlaid and attached to a surface with printed indicia, such as the surface of a perishable product or packaging thereof. The thermally sensitive composition may alternatively itself be imagewise printed on a support to form latent indicia, which becomes visible, or changes color or density level, only upon sufficient thermal exposure to form a message such as "NO GOOD" or "HEAT DAMAGED". In accordance with a further embodiment of the invention, the change in color or density level in a time and temperature indicating device in accordance with the invention may be correlated to indicia in the form of reference colors and/or density levels associated with predetermined levels of thermal exposure.

The time and temperature integrating devices in accordance with the invention can comprise a variety of supports. Examples of useful supports include opaque or transparent poly(vinylacetal) film, polystyrene film, poly(ethyleneterephthalate) film, poly(ethylene naphthalate) film, polycarbonate film, and related films and resinous materials, as well as paper, glass, metal, and other supports that withstand the intended thermal exposure temperature ranges desired to be monitored for a particular product. The use of opaque or reflective supports may be advantageous in that even very slight density and/or color changes in the thermally sensitive compositions used in an indicator in accordance with the invention may be more easily noticed. Even density changes as small as 0.05 units may be sufficient to demonstrate a visually noticeable change with a reflective support.

Adhesive backing layers or overcoats may also be included in the time and temperature integrating devices of the invention to provide means for attaching the devices to a desired product or packaging. Conventional adhesive techniques may be used, including those typically used in the label and decalcomania arts. The use of a pressure-sensitive adhesive layer 13 with an associated release layer 14 as illustrated in FIG. 1, is particularly applicable for use with the time and temperature integrating devices of the invention, as such materials are capable of exerting a strong adhesive force toward a variety of surfaces without requiring activation by heat. Pressure-sensitive adhesives include, e.g., polyesters, natural rubber, styrene butadiene rubber, polyisobutylene, ethylene-vinyl acetate copolymers, acrylics, vinyl acetate copolymers, silicone polymers, poly (vinyl alkyl ethers), and other materials, as described, e.g., in "Encyclopedia of Polymer Science and Engineering", vol 13, pg. 345–368 and vol 8, pg. 617–646, John Wiley & Sons, New York (1985), and Kirk-Othmer "Encyclopedia of Chemical Technology", Jacqueline I. Kirschwitz (Editor), Vol 1, pg. 459–461, John Wiley & Sons, NY (1991).

As used herein, the term "perishable product" refers to foodstuffs, pharmaceuticals, photographic films, chemicals, and the like, which products may be sensitive to exposure to specific temperatures over specific time periods. In accordance with the invention, the thermally sensitive thermographic and photothermographic compositions may be designed to exhibit specific density changes corresponding to specific time and temperature integrated exposures correlated to the specific sensitivities of a particular perishable product. The indicator devices of the invention are particularly suitable for use with silver halide based light sensitive photographic films, which typically demonstrate undesirable degradation upon time and temperature integrated exposures within ranges which correlate well to the time and temperature image development requirements for thermographic and photothermographic compositions.

In one specific preferred embodiment, a time and temperature integrating indicator device in accordance with the invention is used to provide an indication of the cumulative thermal exposure to which a silver halide based photographic material has been subjected. Such photographic material may be, e.g., color negative, color positive, or color reversal films and papers or black and white films and papers. The indicator device may be conveniently applied to a conventional film cartridge, such as a 35 mm or an Advanced Photo System film cartridge, or to packaging of any of the various types of photographic materials, including packaging of single use cameras (also referred to as "film with lens"). As illustrated in FIGS. 3a–3d, in order for an indicator 31 to be visible when in use (e.g., when film 32 has been loaded in a photographic camera 33), it may be positioned on a film cartridge 30 so as to be aligned with camera 33 "film type" window 34 typically provided on camera backs, as disclosed in copending, commonly assigned, U.S. application Ser. No. 08/987,787 filed Dec. 9, 1997 (Kodak Docket No. 76872), the entire disclosure of which is incorporated by reference herein. As shown therein, indicating indicia in association with indicator device 31 provided on cartridge 30 such as "OK" as illustrated in FIGS. 3a and 3b may be simply obscured once the film in the cartridge has been exposed to an undesirable cumulative thermal exposure as illustrated in FIGS. 3c and 3d. It is a unique advantage of the invention that the thermographic or photothermographic film type indicators of the invention may be manufactured in very thin formats, e.g., less than 500 micrometers (more preferably less than 300 micrometers and even less than 150 micrometers) total thickness including support, which allows them to be positioned directly on the film cartridge without impeding the normal function of the film/camera system.

Figure 4A:
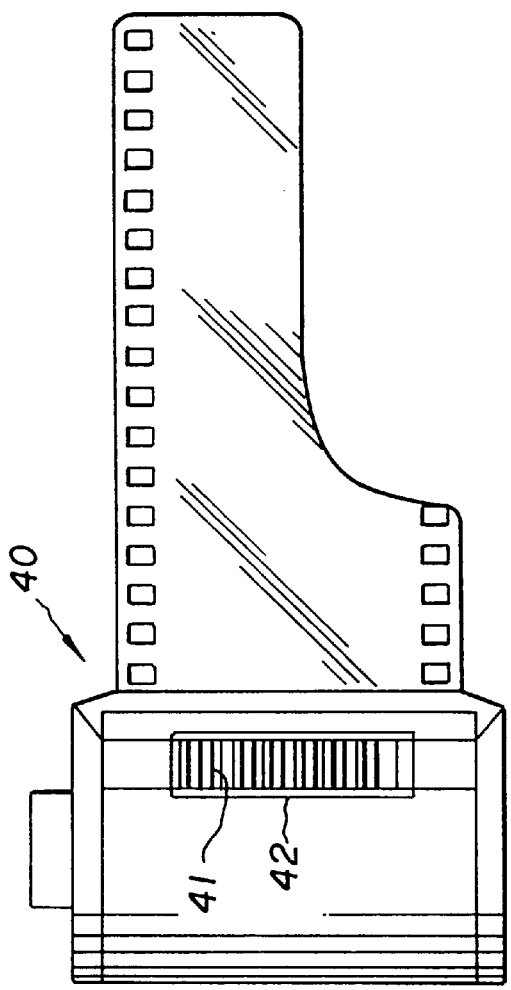
FIGS. 4a and 4b illustrate the use of an indicator device in association with a bar code label of a photographic film cartridge.
Figure 4B:
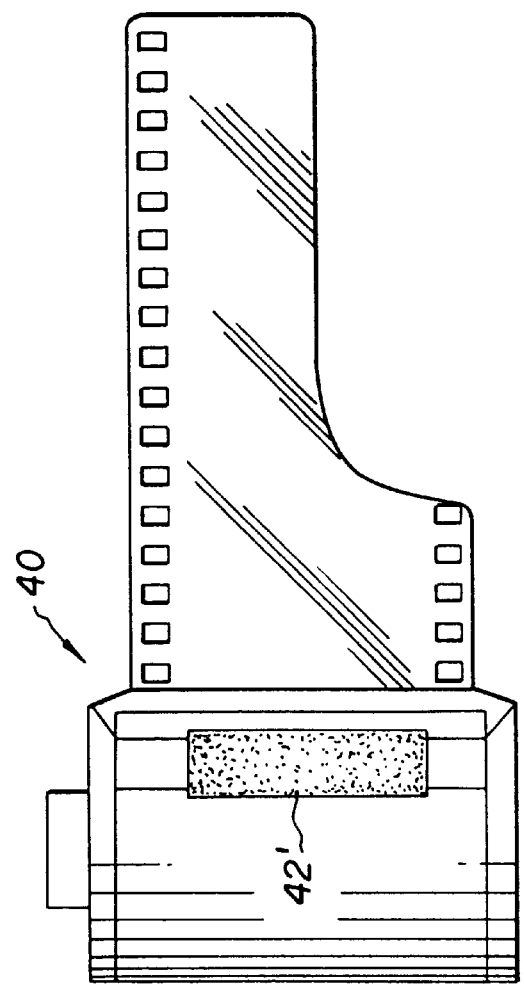

In another specific embodiment of the invention, the thermographic or photothermographic light sensitive composition may be used in association with indicating indicia in the form of a bar code, such that excessive thermal exposure results in obscuring the bar code so as to render it unreadable by a bar code reader. Such obscured bar code reader may then function to provide an indication that the object to which the indicator device is attached has been heat damaged and should be replaced prior to being purchased at a check out counter. As illustrated in FIGS. 4a and 4b, in accordance with a particularly preferred embodiment, an overlay layer 42 comprising the thermographic or photothermographic light sensitive composition may be used in association with the bar code label 41 of a photographic film cartridge 40 as disclosed in U.S. application Ser. No. 08/987,787 (Kodak Docket No. 76872) referenced above. The film cartridge may then automatically communicate to a photofinisher if heat induced film damage had occurred. Film processing pre-splicer equipment typically is designed to read the bar code on a film cartridge to determine the film type and record this information for use by other photofinishing equipment such as photographic printers. If the bar code 41 were obscured by a deployed (e.g., darkened) cumulative heat indicator 42' as illustrated in FIG. 4b, the pre-splicer could be programmed to reject the film cartridge. The heat damaged film contained in the rejected cartridge could then be sent for special photofinishing to compensate for the heat damaged condition. Such special photofinishing, e.g., may include digital optical scanning and printing procedures. Alternatively, a cumulative heat indicator may be used to provide information as to the level of heat a particular film unit has been exposed, and the photofinishing operation may be controlled to optimize photofinishing for the particular film unit in response to such data.

Figure 5A:
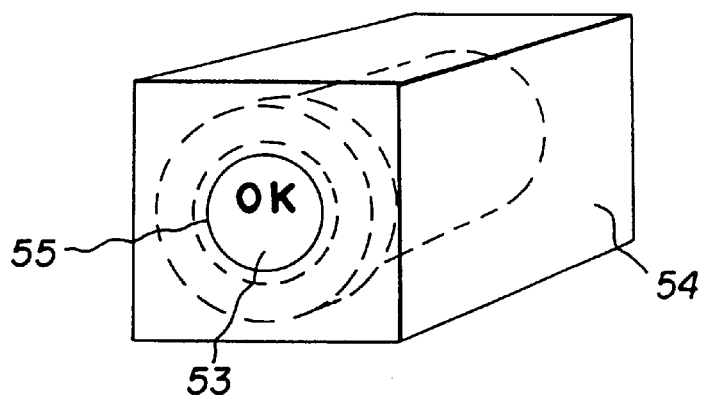
FIG. 5a illustrates a cylindrical packaging canister having an indicator device attached thereto.
Figure 5B:
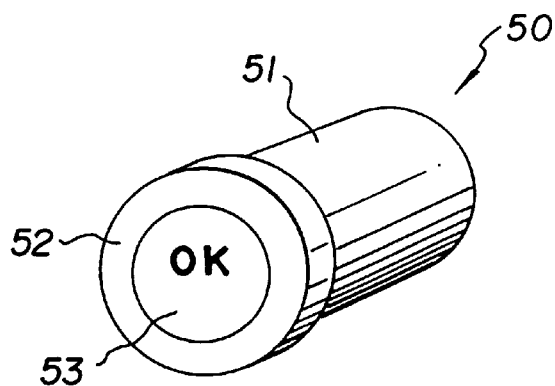
FIG. 5b illustrates the canister of FIG. 5a packaged in an outer enclosure box.
Figure 5C:
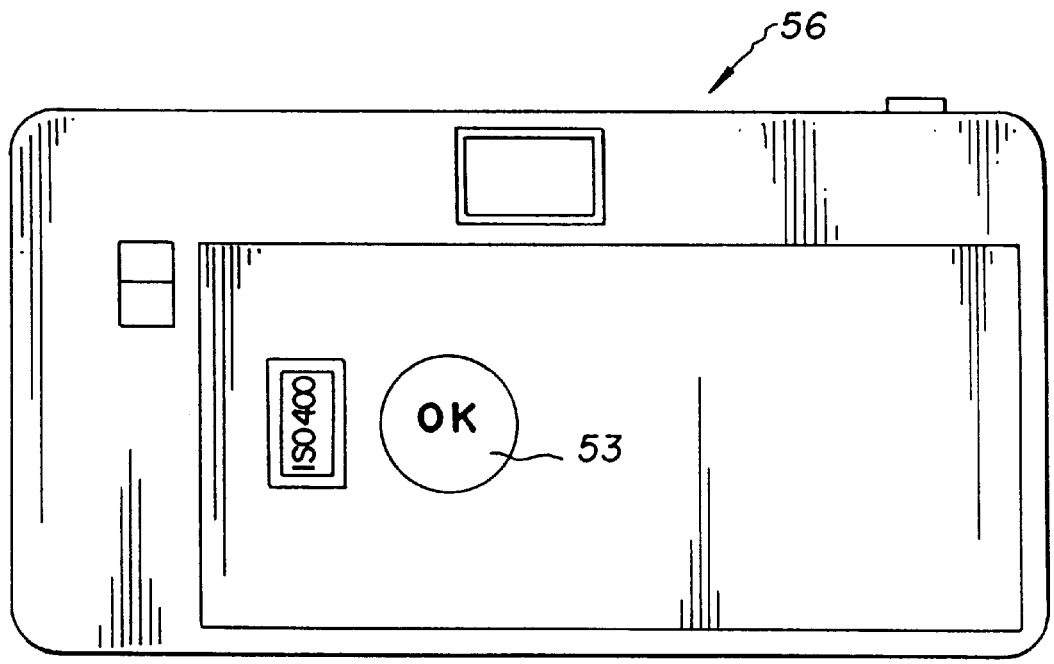
FIG. 5c illustrates a photographic camera having the indicator device of FIG. 5a transferred thereto.

The use of releasably attached time and temperature integrating devices are particularly applicable for use with photographic materials which typically may be packaged in multiple enclosures, as disclosed in copending, commonly assigned, U.S. application Ser. No. 08/987,561 filed Dec. 9, 1997 (Kodak Docket No. 76871), the entire disclosure of which is incorporated by reference herein. Cartridges containing photographic film conventionally may be packaged in a cylindrical enclosure 50 comprising canister 51 and cap 52, which in turn may be packaged in an outer enclosure box 54, as shown in FIGS. 5a and 5b. In such application, a removably attached indicator device 53 may be conveniently attached to the cylindrical enclosure and the outer enclosure box may be fashioned to have a transparent or open section 55 through which the indicator device 53 may be viewed. In such instance, the thermal history of a particular photographic material unit may be easily monitored by distributors and consumers prior to purchase thereof, and the user may subsequently transfer the indicator device 53 to a photographic camera 56 as illustrated in FIG. 5c after the packaging enclosures are opened and the photographic material is loaded in a camera to continue monitoring thermal exposure during use of the photographic material. When the photographic material is subsequently unloaded from the camera, the indicator device may be retransferred to an enclosure for the material to maintain the thermal exposure record up to photographic processing.

The thermally sensitive composition used in the time and temperature integrating devices of the invention comprises an oxidation-reduction image forming combination that contains an organic silver salt oxidizing agent, preferably a silver salt of a long chain fatty acid. Such organic silver salts themselves are resistant to darkening upon illumination. Preferred organic silver salt oxidizing agents are silver salts of long chain fatty acids containing 10 to 30 carbon atoms. Examples of useful organic silver salt oxidizing agents are silver behenate, silver stearate, silver oleate, silver laurate, silver hydroxystearate, silver caprate, silver myristate, and silver palmitate. Combinations of organic silver salt oxidizing agents are also useful. Examples of useful organic silver salt oxidizing agents that are not organic silver salts of fatty acids are silver benzoate and silver benzotriazole.

A variety of reducing agents are useful in the thermally sensitive composition. Examples of useful reducing agents include substituted phenols and naphthols, such as bis-beta-naphthols; polyhydroxybenzene compounds, such as hydroquinones, pyrogallols, catechols, gallic acid and derivatives thereof such as propyl gallate; aminophenols, such as 2,4-diaminophenols and methylaminophenols; ascorbic acid reducing agents, such as ascorbic acid, ascorbic acid ketals, ascorbic acid palmitate and other ascorbic acid derivatives; hydroxylamine reducing agents; 3-pyrazolidone reducing agents, such as 1-phenyl-3-pyrazolidone and 4-methyl-4-hydroxymethyl-1-phenyl-3-pyrazolidone; and sulfonamidophenols and other organic reducing agents known to be useful in thermographic and photothermographic elements, such as described in U.S. Pat. No. 3,933,508, U.S. Pat. No. 3,801,321 and Research Disclosure, June 1978, Item No. 17029. Combinations of organic reducing agents are also useful in the thermally sensitive composition.

Preferred organic reducing agents are sulfonamidophenol reducing agents, such as described in U.S. Pat. No. 3,801, 321. Examples of useful sulfonamidophenol reducing agents include benzenesulfonamidophenols, such as 2,6-dichloro-4-benzenesulfonamidophenol; benzenesulfonamidophenol; 3,6-dibromo-4-benzenesulfonamidophenol and 2,6-dibromo-4-benzenesulfonamidophenol, and combinations thereof.

In accordance with a preferred embodiment of the invention, the thermally sensitive image-forming area of the time and temperature integrating devices comprises at least one layer containing in reactive association in a binder, preferably a binder comprising hydroxyl groups, a light-sensitive photographic silver halide prepared in situ and/or ex situ in combination with the organic silver salt oxidizing agent and the reducing agent for the organic silver salt oxidizing agent. Such image-forming compositions are typically used in photothermographic imaging elements as described in the above cited thermographic imaging element references. References describing such components in the context of photothermographic imaging elements include, for example, U.S. Pat. Nos. 3,457,075; 4,459,350; 4,264,725 and 4,741,992 and Research Disclosure, June 1978, Item No. 17029.

In photothermographic materials it is believed that the latent image silver from the silver halide acts as a catalyst for the described image-forming combination upon thermal exposure. In the time and temperature integrating devices of the invention, photosensitive silver salts may be included to activate or optimize the thermal sensitivity of the device to a particular temperature range for a given application. In one particular embodiment of the invention, a photosensitive silver salt may be used to activate the time and temperature integrating device upon exposure to light. In such embodiment, the thermally sensitive composition of the device may be maintained in a light-tight environment, e.g. through use of a removable opaque overcoat layer, until the device is attached to a perishable product, at which point the device would be exposed to light to fog the photosensitive silver salts and thereby activate the device.

In the case of the time and temperature integrating devices in accordance with the invention which comprise photothermographic compositions which are activated by exposure to light, forms of energy to which the photographic silver halides may be sensitive include ultraviolet, visible and infrared regions of the electromagnetic spectrum as well as electron beam and beta radiation, gamma ray, x-ray, alpha particle, neutron radiation and other forms of corpuscular wave-like radiant energy in either non-coherent (random phase) or coherent (in phase) forms produced by lasers. Exposures may be monochromatic, orthochromatic, or panchromatic depending upon the spectral sensitization of the photographic silver halide. Exposure is preferably for a time and intensity sufficient to fog the composition by producing a developable latent image in the photosensitive silver salts. Spectral sensitizing dyes may be used to provide sensitivity to a particular region of the electromagnetic spectrum, but in general are not necessary for use in thermally sensitive photothermographic compositions which may be used in accordance with the devices of the invention.

A preferred concentration of photographic silver halide for use in the thermally sensitive areas of the time and temperature integrating devices in accordance with preferred embodiments of the invention is within the range of 0.01 to 10 moles of photographic silver halide per mole of organic silver salt oxidizing agent (e.g., silver behenate) in the photothermographic material. Other photosensitive silver salts are useful in combination with the photographic silver halide if desired. Preferred photographic silver halides are silver chloride, silver bromide, silver bromochloride, silver bromoiodide, silver chlorobromoiodide, and mixtures of these silver halides. Very fine grain photographic silver halide is especially useful. The photographic silver halide can be prepared by any of the known procedures in the photographic art. Such procedures for forming photographic silver halides and forms of photographic silver halides are described in, for example, Research Disclosure, June 1978, Item No. 17029 and Research Disclosure, December 1978, Item No. 17643. Tabular grain photosensitive silver halide is also useful, as described in, for example, U.S. Pat. No. 4,435,499. The photographic silver halide can be unwashed or washed, chemically sensitized, protected against the formation of fog, and stabilized against the loss of sensitivity during keeping as described in the above Research Disclosure publications. The silver halides can be prepared in situ as described in, for example, U.S. Pat. No. 4,457,075, or prepared ex situ by methods known in the photographic art.

In accordance with the invention, the thermally sensitive compositions are designed to show progressive, predetermined changes in visual image density corresponding to increased integrated time and temperature exposures. The optimum concentrations of the organic silver salt oxidizing agent and of the reducing agent in the thermally sensitive composition will vary depending upon the desired image density, particular organic silver salt oxidizing agent, particular reducing agent and particular time-temperature sensitivity desired to be achieved. Total silver metal coverages of from about 0.1 to 10 g/m2 may typically be used in the thermally sensitive image forming compositions used in the indicator devices of the invention, but coverages of at least about 1.0 g/m2, and more preferably at least about 2.0 g/m2, are desirable to form images with preferably high densities for the indicator devices of the invention. In general, such components will desirably be present at higher levels than traditionally employed for conventional thermally processed imaging elements, as coverages of less than 2.0 g/m2 total silver are typically used in conventional thermographic and photothermographic imaging elements in order to prevent excessive non-image fogging.

The thermally sensitive areas of the time and temperature integrating devices as described preferably contain various colloids and polymers alone or in combination as vehicles and binders and in various layers. Useful materials are hydrophilic or hydrophobic. They are transparent or translucent and include both naturally occurring substances, such as gelatin, gelatin derivatives, cellulose derivatives, polysaccharides, such as dextran, gum arabic and the like; and synthetic polymeric substances, such as water-soluble polyvinyl compounds like poly(vinyl alcohols), poly(vinylpyrrolidone) and acrylamide polymers. Other synthetic polymeric compounds that are useful include dispersed vinyl compounds such as in latex form and particularly those that increase dimensional stability of photographic elements. Effective polymers include water insoluble polymers of acrylates, such as alkylacrylates and methacrylates, acrylic acid, sulfoacrylates, and those that have cross-linking sites. Preferred high molecular weight materials and resins include poly(vinyl butyral), cellulose acetate butyrate, poly(methylmethacrylate), poly(vinylpyrrolidone), ethyl cellulose, polystyrene, poly(vinylchloride), chlorinated rubbers, polyisobutylene, butadiene-styrene copolymers, copolymers of vinyl chloride and vinyl acetate, copolymers of vinylidene chloride and vinyl acetate, poly(vinyl alcohol) and polycarbonates.

The thermally sensitive compositions as described can contain further addenda that are known to aid in formation of a useful image. The compositions can contain development modifiers that function as speed increasing compounds, sensitizing dyes, hardeners, antistatic agents, plasticizers and lubricants, coating aids, brighteners, absorbing and filter dyes, such as described in Research Disclosure, December 1978, Item No. 17643 and Research Disclosure, June 1978, Item No. 17029. The components of the thermally sensitive composition can be in any location in the time and temperature integrating device that provides the desired visible density change. If desired, one or more of the components can be in one or more layers of the element. For example, in some cases, it is desirable to include certain percentages of the reducing agent, toner, stabilizer and/or other addenda in an overcoat layer over a photothermographic imaging layer of the element. This, in some cases, reduces migration of certain addenda in the layers of the element. It is necessary, however, that the components of the thermally sensitive imaging composition be "in association" with each other in order to produce the desired visible image density change. The term "in association" herein means that the components are in a location with respect to each other that enables the desired visible density change to be observed upon sufficient thermal exposure. The layers of the time and temperature integrating device may be coated on a support by coating procedures known in the photographic art, including dip coating, air knife coating, curtain coating or extrusion coating using hoppers. If desired, two or more layers may be coated simultaneously.

Photothermographic imaging elements of the prior art are typically manufactured to minimize fogging of the silver halide contained therein, while obtaining adequate photographic speed, so as to minimize non-imagewise density development. Time and temperature integrating devices in accordance with the instant invention, on the other hand, will generally not be subject to such antifogging requirements. To the contrary, in accordance with particular embodiments of the invention, chemical sensitizing agents may be included to optimize photosensitivity of silver halide grains incorporated in the photothermographic compositions to optimize the catalytic effect of the silver halide grains on the thermal sensitivity of the composition, and complete fogging may be desired to activate the photothermographic composition to be thermally responsive to a particular temperature range. Thermal stabilizers may also be included, however, to optimize the response range of a thermally sensitive composition to a desired range for a particular application. Thermal stabilizers may also provide improved stability of the element during storage prior to use with a perishable product. Representative thermal stabilizers which may be used for such purposes include 2-bromo-2-arylsulfonylacetamides, such as 2-bromo-2-p-tolysulfonylacetamide; 2-(tribromomethyl sulfonyl) benzothiazole; and 6-substituted-2,4-bis(tribromomethyl)-s-triazines, such as 6-methyl or 6-phenyl-2,4-bis (tribromomethyl)-s-triazine.

In accordance with a particular embodiment, a photothermographic composition incorporating photosensitive silver halide grains which have been chemically sensitized with a gold sensitizer is used in the thermally sensitive areas of the time and temperature integrating devices of the invention, such as described, e.g., in copending, commonly assigned U.S. patent application Ser. No. 08/883,924 of Eshelman et al., filed Jun. 27, 1997, the disclosure of which is incorporated by reference herein. Such gold sensitized photothermographic compositions have been found to be more sensitive, and more easily fogged in the absence of antifogging agents, than conventional photothermographic compositions, and accordingly more applicable to use in accordance with the instant invention. Gold sensitizers may be effective at very low levels, e.g. as low as 0.1 mg/m2, and levels of up to about 8.0 mg/m2 are preferred to provide optimum sensitivity.

The thermally sensitive composition used in the indicator devices of the invention may also comprise a toning agent, also known as an activator-toner or toner-accelerator. Such materials may advantageously perform as development accelerators, and may be included at various levels to optimize desired responses for particular applications. Combinations of toning agents are also useful. Examples of useful toning agents and toning agent combinations are described in, for example, Research Disclosure, June 1978, Item No. 17029 and U.S. Pat. No. 4,123,282. Examples of useful toning agents include, for example, phthalimide, N-hydroxyphthalimide, N-potassium-phthalimide, succinimide, N-hydroxy-1,8-naphthalimide, phthalazine, 1-(2H)-phthalazinone and 2-acetylphthalazinone.

Post-processing image stabilizers and latent image keeping stabilizers are typically useful in photothermographic imaging elements. While generally not necessary for use in the instant invention, such materials may be used to control responses where desired for a particular application. Any of the stabilizers known in the photothermographic art may be useful for the described photothennographic elements. Illustrative examples of useful stabilizers include photolytically active stabilizers and stabilizer precursors as described in, for example, U.S. Pat. No. 4,459,350. Other examples of useful stabilizers include azole thioethers and blocked azolinethione stabilizer precursors and carbamoyl stabilizer precursors, such as described in U.S. Pat. No. 3,877,940.

While photothermographic imaging elements are typically heated at relatively high temperatures for relatively short periods of time after an imagewise exposure until a developed image is formed (e.g., temperature within the range of about 90° C. to 180° C. for about 0.5 to about 60 seconds), the use of the thermally sensitive composition in accordance with the time and temperature integrating devices of the instant invention will typically be formulated to demonstrate a range of visible density increases corresponding to relatively longer periods of exposures, and typically at relatively lower temperatures, such as for periods of minutes, hours, days, weeks, or even months at temperatures ranging from about −40° C. to about 160° C. Elements may also be formulated to exhibit density change responses outside this range if desired. It is an advantage of the invention that thermally sensitive compositions employed in accordance with the indicator devices of the invention may be conveniently designed to exhibit a density change profile corresponding to specific time and temperature integrated exposures desired to be monitored for a particular perishable product.

A wide variety of materials can be used to prepare a backing layer that is compatible with elements comprising thermally sensitive compositions. The backing layer should not adversely affect sensitometric characteristics of the photothermographic element such as minimum density, maximum density and photographic speed. Useful backing layers include those comprised of poly(silicic acid) and a water-soluble hydroxyl containing monomer or polymer that is compatible with poly(silicic acid) as described in U.S. Pat. No. 4,828,971. A combination of poly(silicic acid) and poly(vinyl alcohol) is particularly useful. Other useful backing layers include those formed from polymethylmethacrylate, acrylamide polymers, cellulose acetate, crosslinked polyvinyl alcohol, terpolymers of acrylonitrile, vinylidene chloride, and 2-(methacryloyloxy) ethyl-trimethylammonium methosulfate, crosslinked gelatin, polyesters and polyurethanes. Particularly preferred backing layers are described in above-mentioned U.S. Pat. Nos. 5,310,640 and 5,547,821, the entire disclosures of which are incorporated herein by reference. Backing layers are preferably transparent and may contain organic or inorganic matte particles. The matte particles are preferably beads of poly(methylmethacrylate-co-ethyleneglycoldimethacrylate) with a particle size of 3 to 5 micrometers at a coverage of 25 mg/m2. An electroconductive layer may also be included, and may preferably comprise a colloidal gel of silver-doped vanadium pentoxide dispersed in a polymeric binder. An electroconductive backing layer may also be used comprising a polymeric binder, matte particles and electrically-conductive metal-containing particles dispersed in said binder in an amount sufficient to provide a surface resistivity of less than 5×1011 ohms/square.

The time and temperature integrating device in accordance with the invention may include a protective layer coated over the thermally sensitive composition. Such an overcoat layer may perform several important functions, such as control of humidity of the thermally sensitive composition. The visible density change responses of thermographic and photothermographic compositions due to cumulative thermal exposure as described above are generally dependent upon the relative humidity to which such compositions are exposed. The humidity dependency of the device response may be eliminated by enclosing the thermally sensitive composition in a controlled humidity environment, such as through use of a water impermeable support and protective overcoat layer, or by enclosing the device in an otherwise sealed container. Advantageously, the relative humidity may be controlled to provide specific time and temperature density response curves optimized to match the known time and temperature exposure response of a specific product. Alternatively, where humidity exposure is also a factor in the deterioration of a particular product which is desired to be monitored, cumulative time, temperature and humidity integrated exposures may be monitored with indicator devices in accordance with the invention where the thermally sensitive composition is left exposed to the relative humidity in which it is used.

Protective overcoats may be composed of hydrophilic colloids such as gelatin or poly(vinyl alcohol) but are preferably composed of poly(silicic acid) and a water-soluble hydroxyl-containing monomer or polymer as described in U.S. Pat. No. 4,741,992, issued May 3, 1988. Protective overcoats may also be provided in the form of pressure sensitive laminated films. Alternatively, two elements comprising thermally sensitive compositions coated on supports, at least one of which is transparent, may be laminated together to form a device comprising the thermally sensitive compositions sealed between the supports, or a single element comprising a transparent support may be folded and laminated to seal the thermally sensitive composition between the folded support.

Devices in accordance with the invention which comprise photothermographic compositions may contain a removable pressure sensitive adhesive attached opaque overcoat, or otherwise be packaged in a light-impermeable enclosure, so as to prevent fogging of the light sensitive silver salt contained therein prior to use of the device. The device may then be simply activated by removal of the overcoat or enclosure and exposure to ambient light (or other activating means) prior to being applied to a perishable item or packaging thereof. While the photothermographic composition may still be somewhat sensitive to excessive thermal exposures even prior to be exposed to light, as the exposed silver halide acts as a catalyst, the device prior to exposure may be much more stable in storage.

Figure 6A:
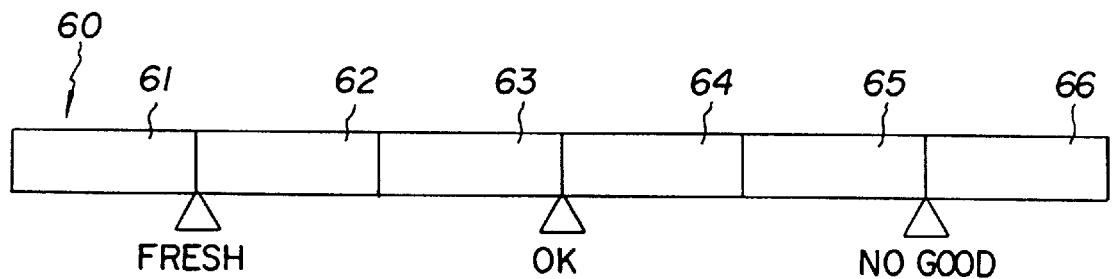
FIG. 6a represents an indicator device comprising areas of differing thermal sensitivity in "fresh" state, having been exposed to no "high temperature" exposure.
Figure 6B:
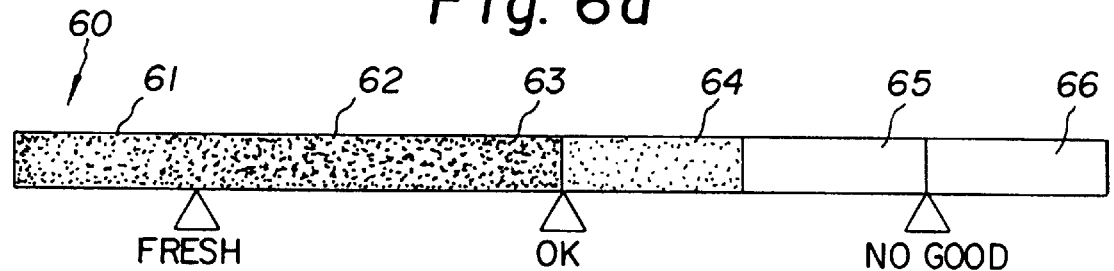
FIGS. 6b–6d represent the same device upon "high temperature" exposures for progressively extended periods of time.
Figure 6C:
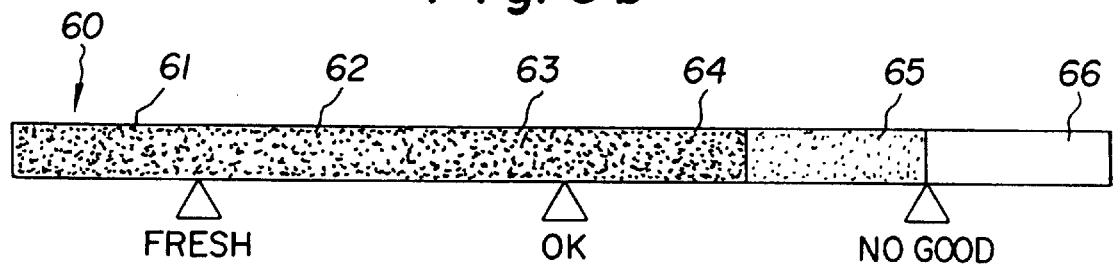
Figure 6D:
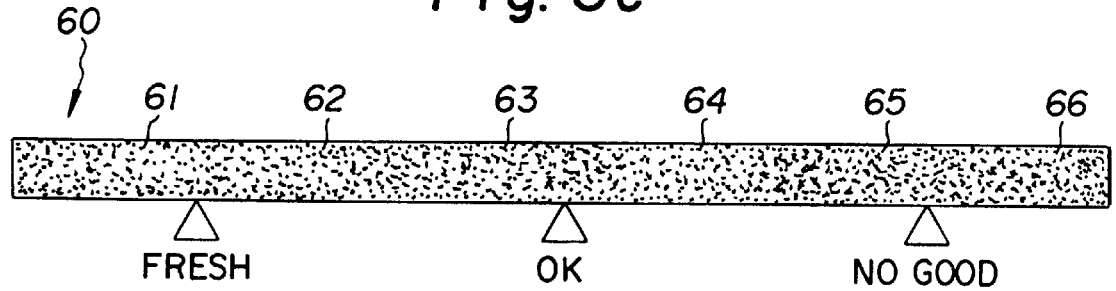

In accordance with a particular embodiment, time and temperature integrating devices may be designed for providing a visually observable indication of various ranges of cumulative thermal exposure as disclosed in copending, commonly assigned, U.S. application Ser. No. 08/987,559 filed Dec. 9, 1997 (Kodak Docket No. 76873), the entire disclosure of which is incorporated by reference herein. Devices in accordance with such embodiment comprise at least two thermally sensitive image-forming areas of differing thermal sensitivity along with indicating indicia in association with the thermally sensitive image forming areas for indicating when each image forming area of the device has been exposed to predetermined cumulative thermal exposures. The two thermally sensitive image-forming areas of different thermal sensitivity may be formed by pre-exposing one of the areas to a controlled level of thermal exposure so as to require less subsequent thermal exposure than at least one other thermally sensitive image-forming area of the device to form an image of the same density. For image-forming areas comprising photothermographic compositions, the areas may be preconditioned with differential light exposures to differentially pre-activate the compositions. Alternatively, the at least two thermally sensitive image forming areas of different thermal sensitivity may comprise different chemical formulations which exhibit different thermal sensitivities. As illustrated in FIGS. 6a–6d, the areas of differing thermal sensitivity may be aligned in an indicator device to form a band 60 which progressively changes from one color or density level to another along the length of the band with increasing thermal exposure. FIG. 6a represents a device comprising areas 61 through 66 of differing thermal sensitivity in "fresh" state, having been exposed to no "high temperature" exposure, while FIGS. 6b–6d represent the same device upon "high temperature" exposures for extended periods of time. Markers adjacent to the band may provide status information such as "FRESH", "OK", and "NO GOOD". This would allow a user to judge the cumulative amount of thermal exposure that a product has been exposed to relative to the quality of the product. Differential pre-heating along the strip may be achieved by contact with multiple temperature controlled heat sources that are set at incrementally decreasing temperatures and shaped and positioned to generate the appropriate pre-heat pattern. Linear array thermal printing heads which are conventionally used in fax machines and thermal dye sublimation printers may be programmed to generate fine heat differentials on the order of 300 different temperatures per inch. This technique would produce a cumulative thermal exposure indicator that would show very fine incremental changes in cumulative heat.

EXAMPLES

In the following examples, film elements comprising various heat sensitive thermographic or photothermographic compositions were prepared and incubated under various temperature and humidity conditions.

For "Free hung" samples, film samples were cut 35 mm by 10 inches long and incubated in humidity and temperature controlled ovens at 21.1° C. through 60.0° C. (70° F. through 140° F.) or held in a freezer at 4.4° C. (40° F.) for various intervals of time from 0 hours to 112 days. The samples were removed from the oven and the status A visual, red, blue, and green densities were measured in the transmission mode using an X-rite densitometer. The progression of density change versus time at each temperature of incubation was followed to determine the rate of fog growth.

For "heat-sealed bags" samples, film samples were cut 35 mm by 10 inches long and were pre-conditioned at 70° F. and at humidities of 15%, 50%, and 80% RH for 24 hours. After the pre-conditioning stage, the samples were placed inside heat-sealed bags with aluminum foil laminate and heat sealed to maintain constant moisture content during incubations. These bags were incubated in humidity and temperature controlled ovens at 21.1° C. through 60.0° C. (70° F. through 140° F.) or held in a freezer at 4.4° C. (40° F.) for various intervals of time from 0 hours to 112 days. The samples were removed from the oven and the status A visual, red, blue, and green densities were measured in the transmission mode using an X-rite densitometer. The visual and blue densities are reported in the table. The progression of density change versus time at each temperature of incubation was followed to determine the rate of fog growth. Depending upon the film type, the humidity dependence on the fog growth varied.

Example 1

Thermally sensitive image-forming elements were prepared by coating the following photothermographic composition at a wet laydown of from 97.1 to 121.4 g/m2 on 100 micrometer thick poly(ethyleneterephthalate) film supports having antistat backcoats to give the dry coverages indicated in Table I below. Total thickness of the coated elements was less than 150 micrometers.

| Photothermographic Composition Component | Grams |
|---|---|
| Silver behanate dispersion (contains 19.4% by weight silver behenate in 5.0% by weight methyl isobutyl ketone (MIBK) solution of polyvinylbutyral (Butvar B-76 which is a trademark of and available from Monsanto Co., USA) | 44.39 |
| NaI | 0.052 |
| Gold sensitized silver bromide emulsion (contains 42.0 grams Ag/liter in 11.4% by weight MIBK solution of Butvar B-76), see Table I below for Gold level | 8.06 |
| Succinimide (8.8% by weight in 12.3% by weight acetone solution of Butvar B-76) | 4.84 |
| SF-96 (5% by weight of SF-96 in MIBK. SF-96 is a polysiloxane fluid available from and a trademark of General Electric Co., U.S.A.) | 0.143 |
| 2-Bromo-2-(4-methylphenylsulfonyl) acetamide (4.0% by weight in acetone), of antifoggant, see Table I below for level | 2.79 |
| 2,4-Bis(trichloromethyl)-6-(1-naphthyl)-s-triazine | 0.027 |
| Palmitic acid (10% by weight in acetone) | 1.74 |
| Sensitizing dye, B-8254 (0.10% by weight in 13.5% by weight acetone solution of Butvar B-76), see Table I below for level | 9.84 |
| 4-Benzenesulfonamidophenol (8.4% by weight in 8.7% by MIBK weight solution of Butvar B-76) | 28.16 |
| | 100.0 |

The chemical sensitization of the AgBr grains was carried out as specified in copending, commonly assigned U.S. patent application Ser. No. 08/883,924 of Eshelman et al., filed Jun. 27, 1997, referenced above, using Na3Au(S2O3)2.

The coatings were dried at a temperature up to 77° C. for 2 minutes in an air chamber and were then overcoated with the following overcoat composition:

| Overcoat Composition Component | Grams |
|---|---|
| Polyvinylalcohol (A 6.0% by weight solution in water of Elvanol 52/22 which is a trademark of E.I. DuPont de Nemours Co., Inc.) | 31.8 |
| Distilled water | 48.6 |
| Hydrolyzed tetraethyl ortho silicate sol-gel (16.5% by weight silica in water/methanol), see U.S. Pat. No. 4,741,992. | 18.5 |
| Surfactant (10G which is para-isononylphenoxypolyglycidol and is a trademark of and available from Olin Corp., USA) | 0.17 |
| Matte | 0.82 |
| | 100.0 |

The resulting overcoat composition was coated over the dried photothermographic silver halide compositions to a wet laydown of 37.8 g/m2. The coating was permitted to dry at a temperature up to 77° C. for 2 minutes in an air chamber.

In the example, only the composition of the photothermographic layer was varied. The composition of the overcoat was constant as described above. The example demonstrates the effect of four factors, namely: level of gold chemical sensitizer for the AgBr grains 4.36, 6.57, 8.72 mg/m2 (0.405, 0.610, 0.810 mg/ft2 ); dry coverage 2153, 2422, 2691 mg/m2 (200, 225, 250 mg total Ag/ft2); antifoggant level 0, 67.9 mg/m2 (0, 6.31 mg/ft2); and sensitizing dye level 0, 6.03 mg/m2 (0, 0.56 mg/ft2). The layout of the example is shown in Table I.

TABLE I

| Part # | Gold level mg/m2 | Dry Coverage mg Ag/m2 | Antifoggant Level mg/m2 | Sensitizing Dye Level mg/m2 |
|---|---|---|---|---|
| 1 | 4.36 | 2153 | 0 | 0 |
| 2 | 4.36 | 2153 | 0 | 6.03 |
| 3 | 4.36 | 2153 | 67.9 | 0 |
| 4 | 4.36 | 2153 | 67.9 | 6.03 |
| 5 | 4.36 | 2691 | 0 | 0 |
| 6 | 4.36 | 2691 | 0 | 6.03 |
| 7 | 4.36 | 2691 | 67.9 | 0 |
| 8 | 4.36 | 2691 | 67.9 | 6.03 |
| 9 | 8.72 | 2153 | 0 | 0 |
| 10 | 8.72 | 2153 | 0 | 6.03 |
| 11 | 8.72 | 2153 | 67.9 | 0 |
| 12 | 8.72 | 2153 | 67.9 | 6.03 |
| 13 | 8.72 | 2691 | 0 | 0 |
| 14 | 8.72 | 2691 | 0 | 6.03 |
| 15 | 8.72 | 2691 | 67.9 | 0 |
| 16 | 8.72 | 2691 | 67.9 | 6.03 |
| 17 | 6.57 | 2422 | 0 | 0 |
| 18 | 6.57 | 2422 | 0 | 6.03 |
| 19 | 6.57 | 2422 | 67.9 | 0 |
| 20 | 6.57 | 2422 | 67.9 | 6.03 |

"Free hung" samples were incubated and evaluated as described above, and the results are indicated in Table II:

TABLE II

Free-Hung Data at 50% RH at 21.1° C. (70° F.), 37.8° C. (100° F.) and 60.0° C. (140° F.) in visual and blue Status A densities only

| | | 21.1° C. | | 37.8° C. | | 60.0° C. | |
|---|---|---|---|---|---|---|---|
| Part # | Time in days | visual | blue | visual | blue | visual | blue |
| 1 | 0 | 0.245 | 0.186 | 0.245 | 0.186 | 0.245 | 0.186 |
| 1 | 1 | . | . | . | . | 1.147 | 1.312 |
| 1 | 3 | . | 0.186 | . | . | 1.755 | 1.684 |

TABLE II-continued

Free-Hung Data at 50% RH at 21.1° C. (70° F.), 37.8° C. (100° F.) and 60.0° C. (140° F.) in visual and blue Status A densities only

| | | 21.1° C. | | 37.8° C. | | 60.0° C. | |
|---|---|---|---|---|---|---|---|
| Part # | Time in days | visual | blue | visual | blue | visual | blue |
| 1 | 7 | 0.263 | 0.216 | 0.351 | 0.357 | 2.392 | 2.323 |
| 1 | 28 | 0.293 | 0.289 | 0.437 | 0.501 | 2.546 | 2.431 |
| 2 | 0 | 0.257 | 0.201 | 0.257 | 0.201 | 0.257 | 0.201 |
| 2 | 1 | . | . | . | . | 0.693 | 1.069 |
| 2 | 3 | . | 0.201 | . | . | 0.828 | 1.271 |
| 2 | 7 | 0.286 | 0.227 | 0.342 | 0.282 | 1.335 | 2.046 |
| 2 | 28 | 0.312 | 0.298 | 0.374 | 0.367 | 2.039 | 2.616 |
| 3 | 0 | 0.223 | 0.136 | 0.223 | 0.136 | 0.223 | 0.136 |
| 3 | 1 | . | . | . | . | 0.816 | 1.149 |
| 3 | 3 | . | . | . | . | 0.828 | 1.271 |
| 3 | 7 | . | . | 0.231 | 0.163 | 1.079 | 1.512 |
| 3 | 28 | 0.215 | 0.103 | 0.228 | 0.162 | 1.301 | 1.730 |
| 4 | 0 | 0.251 | 0.170 | 0.251 | 0.170 | 0.251 | 0.170 |
| 4 | 1 | . | . | . | . | 0.679 | 0.882 |
| 4 | 3 | . | . | . | . | 0.750 | 1.065 |
| 4 | 7 | . | . | 0.273 | 0.168 | 0.967 | 1.405 |
| 4 | 28 | 0.238 | 0.176 | 0.265 | 0.168 | 1.317 | 1.782 |
| 5 | 0 | 0.281 | 0.261 | 0.281 | 0.261 | 0.281 | 0.261 |
| 5 | 1 | . | . | . | . | 1.910 | 1.852 |
| 5 | 3 | . | . | . | . | 2.877 | 2.595 |
| 5 | 7 | 0.300 | 0.302 | 0.529 | 0.580 | 3.381 | 3.151 |
| 5 | 28 | 0.376 | 0.406 | 0.647 | 0.756 | 3.344 | 3.211 |
| 6 | 0 | 0.368 | 0.262 | 0.388 | 0.262 | 0.368 | 0.262 |
| 6 | 1 | . | . | . | . | 1.127 | 1.658 |
| 6 | 3 | . | . | . | . | 1.440 | 2.178 |
| 6 | 7 | . | . | 0.440 | 0.464 | 2.189 | 3.034 |
| 6 | 28 | 0.370 | 0.469 | 0.517 | 0.657 | 2.862 | 3.539 |
| 7 | 0 | 0.190 | 0.104 | 0.190 | 0.104 | 0.190 | 0.104 |
| 7 | 1 | . | . | . | . | 0.321 | 0.442 |
| 7 | 3 | . | . | . | . | 0.393 | 0.650 |
| 7 | 7 | . | . | 0.202 | 0.119 | 0.508 | 0.810 |
| 7 | 28 | 0.185 | 0.071 | 0.198 | 0.111 | 0.632 | 0.931 |
| 8 | 0 | 0.315 | 0.229 | 0.315 | 0.229 | 0.315 | 0.229 |
| 8 | 1 | . | . | . | . | 0.979 | 1.346 |
| 8 | 3 | . | . | . | . | 1.255 | 1.747 |
| 8 | 7 | 0.303 | 0.229 | 0.309 | 0.235 | 1.454 | 2.082 |
| 8 | 28 | 0.277 | 0.258 | 0.313 | 0.256 | 1.734 | 2.444 |
| 9 | 0 | 0.213 | 0.095 | 0.213 | 0.095 | 0.213 | 0.095 |
| 9 | 1 | 0.213 | 0.095 | . | . | 0.428 | 0.472 |
| 9 | 3 | 0.213 | 0.095 | . | . | 0.531 | 0.588 |
| 9 | 7 | 0.213 | 0.095 | 0.233 | 0.147 | 0.741 | 0.792 |
| 9 | 28 | 0.214 | 0.095 | 0.235 | 0.159 | 0.844 | 0.916 |
| 10 | 0 | 0.336 | 0.108 | 0.336 | 0.108 | 0.336 | 0.108 |
| 10 | 1 | . | . | . | . | 0.329 | 0.298 |
| 10 | 3 | . | . | . | . | 0.389 | 0.445 |
| 10 | 7 | 0.286 | 0.108 | 0.320 | 0.118 | 0.458 | 0.598 |
| 10 | 28 | 0.264 | 0.114 | 0.312 | 0.119 | 0.668 | 0.856 |
| 11 | 0 | 0.197 | 0.087 | 0.197 | 0.087 | 0.197 | 0.087 |
| 11 | 1 | . | . | . | . | 0.230 | 0.144 |
| 11 | 3 | . | . | . | . | 0.259 | 0.181 |
| 11 | 7 | 0.206 | 0.096 | 0.200 | 0.089 | 0.364 | 0.281 |
| 11 | 28 | 0.194 | 0.074 | 0.192 | 0.079 | 0.454 | 0.356 |
| 12 | 0 | 0.310 | 0.107 | 0.310 | 0.107 | 0.310 | 0.107 |
| 12 | 1 | . | . | . | . | 0.295 | 0.159 |
| 12 | 3 | . | . | . | . | 0.285 | 0.180 |
| 12 | 7 | . | . | 0.291 | 0.105 | 0.359 | 0.282 |
| 12 | 28 | 0.209 | 0.090 | 0.293 | 0.101 | 0.405 | 0.321 |
| 13 | 0 | 0.211 | 0.100 | 0.211 | 0.100 | 0.211 | 0.100 |
| 13 | 1 | . | . | . | . | 0.508 | 0.567 |
| 13 | 3 | . | . | . | . | 0.703 | 0.782 |
| 13 | 7 | . | . | 0.245 | 0.189 | 0.833 | 0.903 |
| 13 | 28 | 0.224 | 0.118 | 0.292 | 0.283 | 0.930 | 1.011 |
| 14 | 0 | 0.211 | 0.098 | 0.211 | 0.098 | 0.211 | 0.098 |
| 14 | 1 | . | . | . | . | 0.285 | 0.205 |
| 14 | 3 | . | . | . | . | 0.388 | 0.308 |
| 14 | 7 | 0.211 | 0.111 | 0.231 | 0.124 | 0.494 | 0.404 |
| 14 | 28 | 0.214 | 0.094 | 0.218 | 0.112 | 0.655 | 0.573 |
| 15 | 0 | 0.338 | 0.111 | 0.338 | 0.111 | 0.338 | 0.111 |
| 15 | 1 | . | . | . | . | 0.376 | 0.408 |
| 15 | 3 | . | . | . | . | 0.435 | 0.548 |
| 15 | 7 | 0.242 | 0.155 | 0.296 | 0.103 | 0.572 | 0.782 |
| 15 | 28 | 0.240 | 0.150 | 0.289 | 0.108 | 0.766 | 1.053 |
| 16 | 0 | 0.359 | 0.128 | 0.359 | 0.128 | 0.359 | 0.128 |
| 16 | 1 | . | . | . | . | 0.329 | 0.216 |
| 16 | 3 | . | . | . | . | 0.366 | 0.302 |
| 16 | 7 | 0.23 | 0.153 | 0.328 | 0.130 | 0.478 | 0.417 |
| 16 | 28 | 0.222 | 0.115 | 0.330 | 0.127 | 0.568 | 0.492 |
| 17 | 0 | 0.246 | 0.115 | 0.246 | 0.168 | 0.246 | 0.168 |
| 17 | 1 | . | . | . | . | 1.377 | 1.688 |
| 17 | 3 | . | . | . | . | 2.419 | 2.325 |
| 17 | 7 | 0.301 | 0.271 | 0.448 | 0.462 | 2.970 | 2.680 |
| 17 | 28 | 0.340 | 0.327 | 0.593 | 0.666 | 3.200 | 2.934 |
| 18 | 0 | 0.311 | 0.149 | 0.331 | 0.149 | 0.331 | 0.149 |
| 18 | 1 | . | . | . | . | 0.651 | 0.849 |
| 18 | 3 | . | . | . | . | 0.830 | 1.164 |
| 18 | 7 | 0.294 | 0.303 | 0.348 | 0.268 | 1.183 | 1.855 |
| 18 | 28 | 0.294 | 0.314 | 0.364 | 0.304 | 1.698 | 2.434 |
| 19 | 0 | 0.219 | 0.130 | 0.219 | 0.130 | 0.219 | 0.130 |
| 19 | 1 | . | . | . | . | 0.416 | 0.568 |
| 19 | 3 | . | . | . | . | 0.478 | 0.782 |
| 19 | 7 | 0.213 | 0.131 | 0.195 | 0.115 | 0.679 | 1.164 |
| 19 | 28 | 0.207 | 0.114 | 0.191 | 0.105 | 0.908 | 1.407 |
| 20 | 0 | 0.332 | 0.198 | 0.332 | 0.198 | 0.332 | 0.198 |
| 20 | 1 | . | . | . | . | 0.694 | 1.241 |
| 20 | 3 | . | . | . | . | 1.074 | 1.989 |
| 20 | 7 | 0.306 | 0.198 | 0.332 | 0.267 | 1.820 | 2.318 |
| 20 | 28 | 0.236 | 0.149 | 0.312 | 0.255 | 2.430 | 2.690 |

From the above data, it is seen that formulations may be varied to control the density response change as a result of cumulative thermal exposure over a wide range of temperatures.

"Heat-Sealed bag" samples were also incubated and evaluated as described above, and the results are indicated in Table III:

TABLE III

Heat-Sealed Data at 15, 50 & 80% RH at 4.4° C. (40° F.), 21.1° C. (70° F.), 32.2° C. (90° F.), 37.8° C. (100° F.), 48.9° C. (120° F.), 54.4° C. (130° F.), and 60° C. (140° F.) in the visual and blue Status A densities only

| | Time | Temp | 15% RH | | 50% RH | | 80% RH | |
|---|---|---|---|---|---|---|---|---|
| Part # | days | deg C. | visual | blue | visual | blue | visual | blue |
| 1 | 0 | (RT) | 0.225 | 0.134 | 0.225 | 0.134 | 0.224 | 0.134 |
| 1 | 1 | (RT) | 0.225 | 0.155 | 0.225 | 0.155 | 0.225 | 0.155 |
| 1 | 2 | (RT) | 0.232 | 0.174 | 0.232 | 0.174 | 0.232 | 0.174 |
| 1 | 14 | (RT) | 0.231 | 0.162 | 0.232 | 0.161 | 0.232 | 0.161 |
| 1 | 0.167 | 60 | 0.425 | 0.560 | 0.572 | 0.732 | 0.351 | 0.464 |
| 1 | 1.0 | 60 | 0.980 | 0.980 | 1.460 | 1.370 | 0.570 | 0.883 |
| 1 | 2.0 | 60 | 1.719 | 1.556 | 1.961 | 1.876 | 0.889 | 1.202 |
| 1 | 14.0 | 60 | 2.097 | 2.039 | 2.283 | 2.324 | 1.456 | 1.590 |
| 1 | 28.0 | 60 | 2.111 | 2.112 | 2.358 | 2.430 | 1.621 | 1.732 |
| 1 | 42.0 | 60 | 2.230 | 2.349 | 2.331 | 2.547 | 1.822 | 1.989 |
| 1 | 0.167 | 54.4 | 0.278 | 0.278 | 0.325 | 0.361 | 0.280 | 0.310 |
| 1 | 1.0 | 54.4 | 0.445 | 0.553 | 0.649 | 0.789 | 0.360 | 0.460 |
| 1 | 2.0 | 54.4 | 0.876 | 0.926 | 1.015 | 1.028 | 0.474 | 0.687 |
| 1 | 14.0 | 54.4 | 1.493 | 1.332 | 1.607 | 1.488 | 0.829 | 1.115 |
| 1 | 28.0 | 54.4 | 1.530 | 1.368 | 1.572 | 1.465 | 0.910 | 1.133 |
| 1 | 42.0 | 54.4 | 1.585 | 1.478 | 1.725 | 1.672 | 1.152 | 1.337 |
| 1 | 0.167 | 48.9 | 0.248 | 0.213 | 0.265 | 0.258 | 0.260 | 0.260 |
| 1 | 1.0 | 48.9 | 0.295 | 0.301 | 0.363 | 0.405 | 0.286 | 0.323 |
| 1 | 2.0 | 48.9 | 6.408 | 0.454 | 0.538 | 0.642 | 0.328 | 0.389 |
| 1 | 14.0 | 48.9 | 0.757 | 0.810 | 1.009 | 0.977 | 0.416 | 0.545 |
| 1 | 28.0 | 48.9 | 0.916 | 0.924 | 0.985 | 0.941 | 0.507 | 0.706 |
| 1 | 42.0 | 48.9 | 1.046 | 1.003 | 1.155 | 1.079 | 0.623 | 0.886 |
| 1 | 8.0 | 37.8 | 0.279 | 0.266 | 0.344 | 0.350 | 0.275 | 0.291 |

TABLE III-continued

Heat-Sealed Data at 15, 50 & 80% RH at 4.4° C. (40° F.), 21.1° C. (70° F.), 32.2° C. (90° F.), 37.8° C. (100° F.), 48.9° C. (120° F.), 54.4° C. (130° F.), and 60° C. (140° F.) in the visual and blue Status A densities only

| Part # | Time days | Temp deg C. | 15% RH visual | blue | 50% RH visual | blue | 80% RH visual | blue |
|---|---|---|---|---|---|---|---|---|
| 1 | 14.0 | 37.8 | 0.323 | 0.316 | 0.408 | 0.434 | 0.291 | 0.318 |
| 1 | 30.0 | 37.8 | 0.401 | 0.408 | 0.507 | 0.599 | 0.321 | 0.371 |
| 1 | 42.0 | 37.8 | 0.507 | 0.549 | 0.618 | 0.702 | 0.321 | 0.373 |
| 1 | 91.0 | 37.8 | 0.590 | 0.667 | 0.690 | 0.768 | 0.371 | 0.442 |
| 1 | 112.0 | 37.8 | 0.621 | 0.694 | 0.71 | 0.791 | 0.374 | 0.444 |
| 1 | 8.0 | 37.2 | 0.252 | 0.223 | 0.292 | 0.289 | 0.249 | 0.225 |
| 1 | 14.0 | 37.2 | 0.278 | 0.260 | 0.307 | 0.300 | 0.261 | 0.246 |
| 1 | 30.0 | 37.2 | 0.338 | 0.336 | 0.323 | 0.332 | 0.280 | 0.275 |
| 1 | 42.0 | 37.2 | 0.429 | 0.451 | 0.357 | 0.385 | 0.295 | 0.307 |
| 1 | 91.0 | 37.2 | 0.498 | 0.527 | 0.404 | 0.432 | 0.318 | 0.335 |
| 1 | 112.0 | 37.2 | 0.547 | 0.591 | 0.430 | 0.465 | 0.322 | 0.338 |
| 1 | 21.0 | 21.1 | 0.229 | 0.181 | 0.255 | 0.226 | 0.242 | 0.225 |
| 1 | 30.0 | 21.1 | 0.240 | 0.198 | 0.264 | 0.233 | 0.244 | 0.231 |
| 1 | 42.0 | 21.1 | 0.259 | 0.221 | 0.270 | 0.258 | 0.232 | 0.210 |
| 1 | 91.0 | 21.1 | 0.249 | 0.210 | 0.304 | 0.276 | 0.244 | 0.219 |
| 1 | 112.0 | 21.1 | 0.252 | 0.221 | 0.292 | 0.273 | 0.243 | 0.217 |
| 1 | 14.0 | 4.4 | 0.229 | 0.176 | 0.245 | 0.203 | 0.239 | 0.207 |
| 1 | 42.0 | 4.4 | 0.250 | 0.211 | 0.243 | 0.222 | 0.241 | 0.210 |
| 1 | 91.0 | 4.4 | 0.238 | 0.180 | 0.239 | 0.192 | 0.238 | 0.190 |
| 1 | 112.0 | 4.4 | 0.237 | 0.177 | 0.248 | 0.206 | 0.254 | 0.212 |
| 2 | 0 | (RT) | 0.325 | 0.154 | 0.325 | 0.154 | 0.325 | 0.154 |
| 2 | 1 | (RT) | 0.319 | 0.172 | 0.319 | 0.172 | 0.319 | 0.172 |
| 2 | 2 | (RT) | 0.314 | 0.197 | 0.314 | 0.197 | 0.314 | 0.197 |
| 2 | 14 | (RT) | 0.309 | 0.187 | 0.309 | 0.187 | 0.309 | 0.187 |
| 2 | 0.167 | 60 | 0.398 | 0.460 | 0.472 | 0.697 | 0.341 | 0.407 |
| 2 | 1.0 | 60 | 0.754 | 1.031 | 1.114 | 1.491 | 0.457 | 0.712 |
| 2 | 2.0 | 60 | 1.595 | 1.831 | 1.736 | 2.178 | 0.529 | 0.939 |
| 2 | 14.0 | 60 | 2.171 | 2.503 | 2.158 | 2.792 | 0.817 | 1.393 |
| 2 | 28.0 | 60 | 2.058 | 2.370 | 2.294 | 2.966 | 1.040 | 1.637 |
| 2 | 42.0 | 60 | 2.376 | 2.890 | 2.346 | 3.162 | 1.434 | 2.055 |
| 2 | 0.167 | 54.4 | 0.306 | 0.274 | 0.322 | 0.341 | 0.315 | 0.368 |
| 2 | 1.0 | 54.4 | 0.394 | 0.451 | 0.460 | 0.691 | 0.371 | 0.520 |
| 2 | 2.0 | 54.4 | 0.634 | 0.857 | 0.737 | 1.084 | 0.419 | 0.661 |
| 2 | 14.0 | 54.4 | 1.361 | 1.678 | 1.342 | 1.687 | 0.625 | 1.085 |
| 2 | 28.0 | 54.4 | 1.474 | 1.688 | 1.404 | 1.770 | 0.732 | 1.227 |
| 2 | 42.0 | 54.4 | 1.554 | 1.814 | 1.551 | 2.000 | 1.060 | 1.614 |
| 2 | 0.167 | 48.9 | 0.307 | 0.252 | 0.289 | 0.273 | 0.273 | 0.256 |
| 2 | 1.0 | 48.9 | 0.324 | 0.303 | 0.341 | 0.371 | 0.297 | 0.311 |
| 2 | 2.0 | 48.9 | 0.347 | 0.352 | 0.416 | 0.542 | 0.312 | 0.349 |
| 2 | 14.0 | 48.9 | 0.605 | 0.762 | 0.767 | 1.045 | 0.375 | 0.498 |
| 2 | 28.0 | 48.9 | 0.781 | 0.959 | 0.929 | 1.182 | 0.364 | 0.494 |
| 2 | 42.0 | 48.9 | 1.099 | 1.003 | 1.032 | 1.288 | 0.426 | 0.658 |
| 2 | 91.0 | 48.9 | 1.293 | 1.548 | 1.227 | 1.492 | 0.473 | 0.759 |
| 2 | 112.0 | 48.9 | 1.295 | 1.537 | 1.204 | 1.472 | 0.498 | 0.806 |
| 2 | 8.0 | 37.8 | 0.307 | 0.267 | 0.319 | 0.327 | 0.296 | 0.317 |
| 2 | 14.0 | 37.8 | 0.315 | 0.297 | 0.367 | 0.415 | 0.316 | 0.348 |
| 2 | 30.0 | 37.8 | 0.360 | 0.383 | 0.459 | 0.596 | 0.329 | 0.378 |
| 2 | 42.0 | 37.8 | 0.435 | 0.505 | 0.574 | 0.774 | 0.336 | 0.390 |
| 2 | 91.0 | 37.8 | 0.560 | 0.685 | 0.725 | 0.932 | 0.338 | 0.385 |
| 2 | 112.0 | 37.8 | 0.579 | 0.700 | 0.758 | 0.962 | 0.365 | 0.440 |
| 2 | 8.0 | 37.2 | 0.288 | 0.235 | 0.296 | 0.271 | 0.273 | 0.254 |
| 2 | 14.0 | 37.2 | 0.290 | 0.238 | 0.312 | 0.316 | 0.283 | 0.280 |
| 2 | 30.0 | 37.2 | 0.295 | 0.265 | 0.324 | 0.329 | 0.292 | 0.296 |
| 2 | 42.0 | 37.2 | 0.335 | 0.342 | 0.331 | 0.350 | 0.321 | 0.362 |
| 2 | 91.0 | 37.2 | 0.384 | 0.416 | 0.344 | 0.370 | 0.328 | 0.367 |
| 2 | 112.0 | 37.2 | 0.384 | 0.415 | 0.366 | 0.415 | 0.340 | 0.389 |
| 2 | 21.0 | 21.1 | 0.289 | 0.205 | 0.286 | 0.238 | 0.285 | 0.255 |
| 2 | 30.0 | 21.1 | 0.295 | 0.213 | 0.290 | 0.252 | 0.288 | 0.254 |
| 2 | 42.0 | 21.1 | 0.287 | 0.248 | 0.293 | 0.268 | 0.274 | 0.241 |
| 2 | 91.0 | 21.1 | 0.305 | 0.243 | 0.305 | 0.276 | 0.283 | 0.245 |
| 2 | 112.0 | 21.1 | 0.309 | 0.262 | 0.308 | 0.284 | 0.288 | 0.246 |
| 2 | 14.0 | 4.4 | 0.290 | 0.194 | 0.274 | 0.216 | 0.266 | 0.238 |
| 2 | 42.0 | 4.4 | 0.288 | 0.218 | 0.274 | 0.234 | 0.260 | 0.232 |
| 2 | 91.0 | 4.4 | 0.285 | 0.169 | 0.278 | 0.219 | 0.257 | 0.211 |
| 2 | 112.0 | 4.4 | 0.284 | 0.168 | 0.280 | 0.223 | 0.260 | 0.216 |
| 3 | 0 | (RT) | 0.220 | 0.125 | 0.220 | 0.125 | 0.220 | 0.125 |
| 3 | 1 | (RT) | 0.219 | 0.131 | 0.219 | 0.131 | 0.219 | 0.131 |
| 3 | 2 | (RT) | 0.216 | 0.126 | 0.216 | 0.126 | 0.216 | 0.126 |
| 3 | 14 | (RT) | 0.220 | 0.131 | 0.220 | 0.131 | 0.220 | 0.131 |
| 3 | 0.167 | 60 | 0.312 | 0.346 | 0.357 | 0.486 | 0.224 | 0.157 |
| 3 | 1.0 | 60 | 0.678 | 0.753 | 1.077 | 1.026 | 0.231 | 0.190 |
| 3 | 2.0 | 60 | 1.268 | 1.091 | 1.491 | 1.627 | 0.292 | 0.297 |
| 3 | 14.0 | 60 | 1.689 | 1.746 | 1.716 | 2.050 | 0.462 | 0.502 |
| 3 | 28.0 | 60 | 1.739 | 1.834 | 1.855 | 2.217 | 0.581 | 0.629 |
| 3 | 91.0 | 60 | 1.924 | 2.890 | 1.895 | 2.210 | 0.892 | 1.016 |
| 3 | 0.167 | 54.4 | 0.233 | 0.155 | 0.238 | 0.166 | 0.227 | 0.156 |
| 3 | 1.0 | 54.4 | 0.263 | 0.240 | 0.314 | 0.358 | 0.237 | 0.194 |
| 3 | 2.0 | 54.4 | 0.340 | 0.366 | 0.577 | 0.519 | 0.261 | 0.258 |
| 3 | 14.0 | 54.4 | 0.902 | 0.820 | 1.047 | 1.005 | 0.429 | 0.447 |
| 3 | 28.0 | 54.4 | 0.954 | 0.915 | 0.992 | 0.958 | 0.557 | 0.553 |
| 3 | 91.0 | 54.4 | 1.019 | 0.998 | 1.062 | 1.037 | 0.737 | 0.705 |
| 3 | 0.167 | 48.9 | 0.226 | 0.146 | 0.228 | 0.142 | 0.216 | 0.132 |
| 3 | 1.0 | 48.9 | 0.238 | 0.174 | 0.232 | 0.168 | 0.217 | 0.144 |
| 3 | 2.0 | 48.9 | 0.248 | 0.195 | 0.242 | 0.190 | 0.225 | 0.160 |
| 3 | 14.0 | 48.9 | 0.288 | 0.266 | 0.464 | 0.432 | 0.242 | 0.197 |
| 3 | 28.0 | 48.9 | 0.372 | 0.349 | 0.593 | 0.556 | 0.251 | 0.211 |
| 3 | 91.0 | 48.9 | 0.754 | 0.733 | 0.754 | 0.717 | 0.343 | 0.343 |
| 3 | 112.0 | 48.9 | 0.726 | 0.695 | 0.749 | 0.707 | 0.370 | 0.368 |
| 3 | 8.0 | 37.8 | 0.233 | 0.152 | 0.227 | 0.148 | 0.220 | 0.147 |
| 3 | 14.0 | 37.8 | 0.227 | 0.155 | 0.237 | 0.170 | 0.217 | 0.142 |
| 3 | 30.0 | 37.8 | 0.230 | 0.161 | 0.242 | 0.183 | 0.221 | 0.149 |
| 3 | 42.0 | 37.8 | 0.232 | 0.168 | 0.257 | 0.213 | 0.218 | 0.149 |
| 3 | 91.0 | 37.8 | 0.250 | 0.189 | 0.296 | 0.258 | 0.224 | 0.152 |
| 3 | 112.0 | 37.8 | 0.236 | 0.169 | 0.300 | 0.258 | 0.221 | 0.145 |
| 3 | 8.0 | 37.2 | 0.216 | 0.138 | 0.225 | 0.145 | 0.206 | 0.114 |
| 3 | 14.0 | 37.2 | 0.227 | 0.150 | 0.230 | 0.158 | 0.210 | 0.122 |
| 3 | 30.0 | 37.2 | 0.224 | 0.147 | 0.232 | 0.166 | 0.212 | 0.129 |
| 3 | 42.0 | 37.2 | 0.231 | 0.159 | 0.230 | 0.169 | 0.205 | 0.117 |
| 3 | 91.0 | 37.2 | 0.229 | 0.158 | 0.242 | 0.179 | 0.215 | 0.128 |
| 3 | 112.0 | 37.2 | 0.235 | 0.166 | 0.248 | 0.191 | 0.213 | 0.129 |
| 3 | 21.0 | 2.1 | 0.221 | 0.133 | 0.226 | 0.137 | 0.217 | 0.128 |
| 3 | 30.0 | 2.1 | 0.234 | 0.158 | 0.229 | 0.145 | 0.218 | 0.131 |
| 3 | 42.0 | 2.1 | 0.222 | 0.143 | 0.233 | 0.148 | 0.211 | 0.121 |
| 3 | 91.0 | 2.1 | 0.230 | 0.140 | 0.222 | 0.134 | 0.212 | 0.115 |
| 3 | 112.0 | 2.1 | 0.226 | 0.138 | 0.231 | 0.140 | 0.209 | 0.112 |
| 3 | 14.0 | 4.4 | 0.219 | 0.134 | 0.218 | 0.131 | 0.213 | 0.119 |
| 3 | 42.0 | 4.4 | 0.221 | 0.138 | 0.225 | 0.138 | 0.207 | 0.115 |
| 3 | 91.0 | 4.4 | 0.221 | 0.125 | 0.224 | 0.127 | 0.211 | 0.112 |
| 3 | 112.0 | 4.4 | 0.219 | 0.123 | 0.223 | 0.126 | 0.213 | 0.112 |
| 5 | 0 | (RT) | 0.264 | 0.185 | 0.264 | 0.185 | 0.264 | 0.185 |
| 5 | 1 | (RT) | 0.260 | 0.198 | 0.260 | 0.198 | 0.260 | 0.198 |
| 5 | 2 | (RT) | 0.27 | 0.215 | 0.271 | 0.215 | 0.271 | 0.215 |
| 5 | 14 | (RT) | 0.272 | 0.225 | 0.272 | 0.225 | 0.272 | 0.225 |
| 5 | 0.167 | 60 | 0.619 | 0.782 | 0.902 | 0.978 | 0.497 | 0.690 |
| 5 | 1.0 | 60 | 1.769 | 1.575 | 1.938 | 1.784 | 0.757 | 1.088 |
| 5 | 2.0 | 60 | 2.384 | 2.248 | 2.736 | 2.769 | 1.240 | 1.515 |
| 5 | 14.0 | 60 | 2.817 | 2.925 | 3.028 | 3.291 | 1.943 | 2.010 |
| 5 | 28.0 | 60 | 3.108 | 3.412 | 3.248 | 3.592 | 2.082 | 2.145 |
| 5 | 42.0 | 60 | 3.242 | 3.775 | 3.206 | 3.690 | 2.317 | 2.420 |
| 5 | 0.167 | 54.4 | 0.366 | 0.414 | 0.435 | 0.551 | 0.357 | 0.480 |
| 5 | 1.0 | 54.4 | 0.719 | 0.878 | 0.987 | 1.079 | 0.477 | 0.697 |
| 5 | 2.0 | 54.4 | 1.268 | 1.231 | 1.513 | 1.427 | 0.675 | 1.007 |
| 5 | 14.0 | 54.4 | 1.957 | 1.814 | 2.081 | 2.004 | 1.154 | 1.457 |
| 5 | 28.0 | 54.4 | 2.072 | 1.963 | 2.167 | 2.128 | 1.368 | 1.614 |
| 5 | 42.0 | 54.4 | 2.022 | 2.007 | 2.208 | 2.271 | 1.651 | 1.855 |
| 5 | 0.167 | 48.9 | 0.310 | 0.327 | 0.336 | 0.380 | 0.309 | 0.302 |
| 5 | 1.0 | 48.9 | 0.389 | 0.453 | 0.510 | 0.628 | 0.365 | 0.398 |
| 5 | 2.0 | 48.9 | 0.566 | 0.658 | 0.727 | 0.839 | 0.455 | 0.545 |
| 5 | 14.0 | 48.9 | 1.161 | 1.149 | 1.289 | 1.212 | 0.639 | 0.849 |
| 5 | 28.0 | 48.9 | 1.285 | 1.227 | 1.387 | 1.283 | 0.703 | 0.943 |
| 5 | 42.0 | 48.9 | 1.678 | 1.326 | 1.462 | 1.378 | 0.850 | 1.119 |
| 5 | 91.0 | 48.9 | 1.739 | 1.729 | 1.620 | 1.526 | 1.035 | 1.310 |
| 5 | 112.0 | 48.9 | 1.707 | 1.688 | 1.640 | 1.551 | 1.117 | 1.366 |
| 5 | 8.0 | 37.8 | 0.367 | 0.395 | 0.475 | 0.548 | 0.352 | 0.360 |
| 5 | 14.0 | 37.8 | 0.433 | 0.485 | 0.561 | 0.641 | 0.393 | 0.420 |
| 5 | 30.0 | 37.8 | 0.535 | 0.589 | 0.759 | 0.840 | 0.476 | 0.540 |
| 5 | 42.0 | 37.8 | 0.757 | 0.853 | 0.906 | 0.959 | 0.577 | 0.697 |
| 5 | 91.0 | 37.8 | 0.857 | 0.943 | 0.984 | 1.012 | 0.669 | 0.822 |
| 5 | 112.0 | 37.8 | 0.875 | 0.963 | 0.989 | 1.014 | 0.681 | 0.838 |
| 5 | 8.0 | 37.2 | 0.303 | 0.308 | 0.375 | 0.407 | 0.311 | 0.339 |

TABLE III-continued

Heat-Sealed Data at 15, 50 & 80% RH at 4.4° C. (40° F.), 21.1° C. (70° F.), 32.2° C. (90° F.), 37.8° C. (100° F.), 48.9° C. (120° F.), 54.4° C. (130° F.), and 60° C. (140° F.) in the visual and blue Status A densities only

| | | | 15% RH | | 50% RH | | 80% RH | |
|---|---|---|---|---|---|---|---|---|
| Part # | Time days | Temp deg C. | visual | blue | visual | blue | visual | blue |
| 5 | 14.0 | 37.2 | 0.342 | 0.366 | 0.449 | 0.499 | 0.339 | 0.384 |
| 5 | 30.0 | 37.2 | 0.390 | 0.422 | 0.541 | 0.610 | 0.370 | 0.423 |
| 5 | 42.0 | 37.2 | 0.498 | 0.544 | 0.685 | 0.765 | 0.415 | 0.503 |
| 5 | 91.0 | 37.2 | 0.578 | 0.638 | 0.732 | 0.823 | 0.510 | 0.673 |
| 5 | 112.0 | 37.2 | 0.678 | 0.756 | 0.759 | 0.849 | 0.546 | 0.733 |
| 5 | 21.0 | 21.1 | 0.289 | 0.284 | 0.322 | 0.349 | 0.261 | 0.209 |
| 5 | 30.0 | 21.1 | 0.292 | 0.290 | 0.323 | 0.347 | 0.272 | 0.234 |
| 5 | 42.0 | 21.1 | 0.322 | 0.341 | 0.361 | 0.405 | 0.272 | 0.241 |
| 5 | 91.0 | 21.1 | 0.315 | 0.322 | 0.385 | 0.412 | 0.286 | 0.247 |
| 5 | 112.0 | 21.1 | 0.319 | 0.333 | 0.409 | 0.450 | 0.292 | 0.258 |
| 5 | 14.0 | 4.4 | 0.268 | 0.233 | 0.294 | 0.294 | 0.212 | 0.299 |
| 5 | 42.0 | 4.4 | 0.300 | 0.295 | 0.303 | 0.326 | 0.285 | 0.290 |
| 5 | 91.0 | 4.4 | 0.270 | 0.225 | 0.294 | 0.291 | 0.284 | 0.272 |
| 5 | 112.0 | 4.4 | 0.274 | 0.231 | 0.287 | 0.273 | 0.281 | 0.263 |
| 6 | 0 | (RT) | 0.373 | 0.210 | 0.373 | 0.210 | 0.373 | 0.210 |
| 6 | 1 | (RT) | 0.362 | 0.254 | 0.362 | 0.254 | 0.362 | 0.254 |
| 6 | 2 | (RT) | 0.363 | 0.281 | 0.363 | 0.281 | 0.363 | 0.281 |
| 6 | 14 | (RT) | 0.373 | 0.288 | 0.373 | 0.288 | 0.373 | 0.288 |
| 6 | 0.167 | 60 | 0.514 | 0.690 | 0.792 | 1.089 | 0.427 | 0.621 |
| 6 | 1.0 | 60 | 1.334 | 1.602 | 1.648 | 1.988 | 0.660 | 1.149 |
| 6 | 2.0 | 60 | 2.333 | 2.625 | 2.473 | 3.030 | 0.991 | 1.684 |
| 6 | 14.0 | 60 | 2.941 | 3.427 | 3.199 | 3.874 | 1.608 | 2.400 |
| 6 | 28.0 | 60 | 3.068 | 3.624 | 3.121 | 3.849 | 1.786 | 2.623 |
| 6 | 42.0 | 60 | 3.198 | 3.887 | 3.107 | 3.866 | 1.982 | 2.911 |
| 6 | 0.167 | 54.4 | 0.363 | 0.406 | 0.414 | 0.547 | 0.348 | 0.437 |
| 6 | 1.0 | 54.4 | 0.573 | 0.755 | 0.777 | 1.157 | 0.476 | 0.610 |
| 6 | 2.0 | 54.4 | 0.974 | 1.303 | 1.259 | 1.639 | 0.518 | 0.855 |
| 6 | 14.0 | 54.4 | 1.883 | 2.125 | 1.945 | 2.385 | 0.849 | 1.478 |
| 6 | 28.0 | 54.4 | 2.063 | 2.146 | 1.926 | 2.386 | 1.033 | 1.708 |
| 6 | 42.0 | 54.4 | 2.214 | 2.559 | 2.063 | 2.648 | 1.320 | 2.029 |
| 6 | 0.167 | 48.9 | 0.335 | 0.306 | 0.332 | 0.364 | 0.325 | 0.377 |
| 6 | 1.0 | 48.9 | 0.373 | 0.394 | 0.443 | 0.571 | 0.364 | 0.467 |
| 6 | 2.0 | 48.9 | 0.480 | 0.579 | 0.564 | 0.801 | 0.392 | 0.528 |
| 6 | 14.0 | 48.9 | 1.017 | 1.296 | 1.059 | 1.478 | 0.498 | 0.779 |
| 6 | 28.0 | 48.9 | 1.277 | 1.509 | 1.278 | 1.553 | 0.515 | 0.821 |
| 6 | 42.0 | 48.9 | 1.413 | 1.673 | 1.419 | 1.714 | 0.618 | 1.031 |
| 6 | 91.0 | 48.9 | 1.683 | 2.131 | 1.641 | 2.064 | 0.744 | 1.212 |
| 6 | 112.0 | 48.9 | 1.643 | 2.042 | 1.622 | 2.026 | 0.805 | 1.301 |
| 6 | 8.0 | 37.8 | 0.355 | 0.373 | 0.407 | 0.494 | 0.342 | 0.392 |
| 6 | 14.0 | 37.8 | 0.385 | 0.426 | 0.465 | 0.609 | 0.360 | 0.434 |
| 6 | 30.0 | 37.8 | 0.476 | 0.563 | 0.576 | 0.780 | 0.371 | 0.453 |
| 6 | 42.0 | 37.8 | 0.662 | 0.859 | 0.748 | 0.995 | 0.431 | 0.571 |
| 6 | 91.0 | 37.8 | 0.740 | 0.967 | 0.846 | 1.098 | 0.457 | 0.611 |
| 6 | 112.0 | 37.8 | 0.788 | 1.023 | 0.912 | 1.170 | 0.477 | 0.645 |
| 6 | 8.0 | 37.2 | 0.343 | 0.357 | 0.361 | 0.407 | 0.325 | 0.356 |
| 6 | 14.0 | 37.2 | 0.364 | 0.394 | 0.400 | 0.495 | 0.347 | 0.398 |
| 6 | 30.0 | 37.2 | 0.377 | 0.424 | 0.426 | 0.537 | 0.361 | 0.425 |
| 6 | 42.0 | 37.2 | 0.431 | 0.506 | 0.509 | 0.717 | 0.386 | 0.476 |
| 6 | 91.0 | 37.2 | 0.468 | 0.551 | 0.568 | 0.825 | 0.413 | 0.515 |
| 6 | 112.0 | 37.2 | 0.533 | 0.655 | 0.584 | 0.851 | 0.412 | 0.508 |
| 6 | 21.0 | 21.1 | 0.333 | 0.301 | 0.326 | 0.336 | 0.334 | 0.357 |
| 6 | 42.0 | 21.1 | 0.328 | 0.337 | 0.346 | 0.388 | 0.325 | 0.346 |
| 6 | 91.0 | 21.1 | 0.338 | 0.321 | 0.360 | 0.391 | 0.333 | 0.345 |
| 6 | 112.0 | 21.1 | 0.346 | 0.340 | 0.351 | 0.372 | 0.328 | 0.332 |
| 6 | 14.0 | 4.4 | 0.321 | 0.282 | 0.331 | 0.314 | 0.323 | 0.361 |
| 6 | 42.0 | 4.4 | 0.325 | 0.311 | 0.329 | 0.352 | 0.296 | 0.311 |
| 6 | 91.0 | 4.4 | 0.328 | 0.284 | 0.335 | 0.323 | 0.314 | 0.329 |
| 6 | 112.0 | 4.4 | 0.325 | 0.278 | 0.332 | 0.313 | 0.309 | 0.318 |
| 17 | 0 | (RT) | 0.257 | 0.185 | 0.257 | 0.185 | 0.257 | 0.185 |
| 17 | 1 | (RT) | 0.256 | 0.196 | 0.256 | 0.196 | 0.256 | 0.196 |
| 17 | 2 | (RT) | 0.271 | 0.226 | 0.271 | 0.226 | 0.271 | 0.226 |
| 17 | 14 | (RT) | 0.264 | 0.214 | 0.264 | 0.214 | 0.264 | 0.214 |
| 17 | 0.167 | 60 | 0.578 | 0.829 | 0.768 | 1.047 | 0.497 | 0.663 |
| 17 | 1.0 | 60 | 1.805 | 1.731 | 1.899 | 1.895 | 0.782 | 1.176 |
| 17 | 2.0 | 60 | 2.430 | 2.176 | 2.859 | 2.692 | 1.130 | 1.591 |
| 17 | 14.0 | 60 | 2.958 | 2.770 | 3.220 | 3.145 | 1.713 | 2.009 |
| 17 | 28.0 | 60 | 3.106 | 3.624 | 3.225 | 3.179 | 1.956 | 2.205 |
| 17 | 42.0 | 60 | 3.386 | 3.596 | 3.197 | 3.314 | 2.131 | 2.371 |
| 17 | 0.167 | 54.4 | 0.363 | 0.397 | 0.422 | 0.502 | 0.334 | 0.378 |
| 17 | 1.0 | 54.4 | 0.618 | 0.798 | 0.814 | 1.053 | 0.493 | 0.624 |
| 17 | 2.0 | 54.4 | 1.034 | 1.022 | 1.409 | 1.471 | 0.656 | 0.913 |
| 17 | 14.0 | 54.4 | 1.867 | 1.756 | 1.999 | 1.878 | 1.038 | 1.445 |
| 17 | 28.0 | 54.4 | 2.058 | 1.921 | 2.057 | 1.947 | 1.183 | 1.587 |
| 17 | 42.0 | 54.4 | 2.084 | 1.983 | 2.195 | 2.128 | 1.398 | 1.766 |
| 17 | 0.167 | 48.9 | 0.303 | 0.294 | 0.318 | 0.329 | 0.293 | 0.295 |
| 17 | 1.0 | 48.9 | 0.380 | 0.420 | 0.464 | 0.558 | 0.337 | 0.380 |
| 17 | 2.0 | 48.9 | 0.545 | 0.627 | 0.628 | 0.774 | 0.414 | 0.497 |
| 17 | 14.0 | 48.9 | 0.934 | 1.079 | 1.165 | 1.252 | 0.573 | 0.737 |
| 17 | 28.0 | 48.9 | 1.107 | 1.254 | 1.340 | 1.372 | 0.633 | 0.842 |
| 17 | 42.0 | 48.9 | 1.242 | 1.368 | 1.458 | 1.453 | 0.824 | 1.167 |
| 17 | 91.0 | 48.9 | 1.568 | 1.716 | 1.547 | 1.524 | 0.997 | 1.407 |
| 17 | 112.0 | 48.9 | 1.618 | 1.772 | 1.602 | 1.575 | 1.040 | 1.454 |
| 17 | 8.0 | 37.8 | 0.355 | 0.373 | 0.426 | 0.464 | 0.330 | 0.364 |
| 17 | 14.0 | 37.8 | 0.416 | 0.455 | 0.529 | 0.592 | 0.354 | 0.404 |
| 17 | 30.0 | 37.8 | 0.540 | 0.583 | 0.667 | 0.770 | 0.388 | 0.449 |
| 17 | 42.0 | 37.8 | 0.680 | 0.762 | 0.735 | 0.865 | 0.397 | 0.478 |
| 17 | 91.0 | 37.8 | 0.756 | 0.869 | 0.854 | 1.005 | 0.448 | 0.545 |
| 17 | 112.0 | 37.8 | 0.797 | 0.938 | 0.833 | 0.982 | 0.442 | 0.532 |
| 17 | 8.0 | 37.2 | 0.303 | 0.296 | 0.372 | 0.398 | 0.292 | 0.306 |
| 17 | 14.0 | 37.2 | 0.331 | 0.343 | 0.418 | 0.450 | 0.317 | 0.335 |
| 17 | 30.0 | 37.2 | 0.395 | 0.424 | 0.444 | 0.496 | 0.364 | 0.403 |
| 17 | 42.0 | 37.2 | 0.511 | 0.555 | 0.550 | 0.625 | 0.406 | 0.474 |
| 17 | 91.0 | 37.2 | 0.578 | 0.618 | 0.639 | 0.749 | 0.542 | 0.631 |
| 17 | 112.0 | 37.2 | 0.621 | 0.669 | 0.649 | 0.771 | 0.573 | 0.660 |
| 17 | 21.0 | 21.1 | 0.272 | 0.242 | 0.292 | 0.290 | 0.279 | 0.273 |
| 17 | 30.0 | 21.1 | 0.279 | 0.258 | 0.299 | 0.295 | 0.283 | 0.280 |
| 17 | 42.0 | 21.1 | 0.296 | 0.268 | 0.328 | 0.346 | 0.279 | 0.285 |
| 17 | 91.0 | 21.1 | 0.293 | 0.272 | 0.375 | 0.387 | 0.287 | 0.278 |
| 17 | 112.0 | 21.1 | 0.303 | 0.294 | 0.377 | 0.393 | 0.287 | 0.277 |
| 17 | 14.0 | 4.4 | 0.274 | 0.239 | 0.274 | 0.240 | 0.269 | 0.246 |
| 17 | 42.0 | 4.4 | 0.284 | 0.262 | 0.284 | 0.272 | 0.266 | 0.251 |
| 17 | 91.0 | 4.4 | 0.275 | 0.230 | 0.283 | 0.250 | 0.275 | 0.230 |
| 17 | 112.0 | 4.4 | 0.270 | 0.224 | 0.280 | 0.240 | 0.272 | 0.237 |
| 18 | 0 | (RT) | 0.346 | 0.173 | 0.346 | 0.173 | 0.346 | 0.173 |
| 18 | 1 | (RT) | 0.343 | 0.187 | 0.343 | 0.187 | 0.343 | 0.187 |
| 18 | 2 | (RT) | 0.336 | 0.210 | 0.336 | 0.210 | 0.336 | 0.210 |
| 18 | 14 | (RT) | 0.347 | 0.214 | 0.347 | 0.214 | 0.347 | 0.214 |
| 18 | 0.167 | 60 | 0.462 | 0.527 | 0.576 | 0.807 | 0.400 | 0.462 |
| 18 | 1.0 | 60 | 1.015 | 1.426 | 1.286 | 1.838 | 0.494 | 0.640 |
| 18 | 2.0 | 60 | 2.006 | 2.323 | 2.124 | 2.584 | 0.622 | 0.897 |
| 18 | 14.0 | 60 | 2.610 | 2.804 | 2.834 | 3.266 | 0.931 | 1.432 |
| 18 | 28.0 | 60 | 2.979 | 3.143 | 2.985 | 3.377 | 1.118 | 1.675 |
| 18 | 42.0 | 60 | 3.201 | 3.500 | 3.042 | 3.502 | 1.629 | 2.238 |
| 18 | 0.167 | 54.4 | 0.340 | 0.310 | 0.363 | 0.384 | 0.312 | 0.303 |
| 18 | 1.0 | 54.4 | 0.477 | 0.530 | 0.610 | 0.834 | 0.377 | 0.437 |
| 18 | 2.0 | 54.4 | 0.766 | 0.953 | 0.928 | 1.340 | 0.456 | 0.572 |
| 18 | 14.0 | 54.4 | 1.647 | 1.937 | 1.566 | 2.002 | 0.698 | 1.012 |
| 18 | 28.0 | 54.4 | 1.788 | 2.084 | 1.650 | 2.142 | 0.770 | 1.155 |
| 18 | 42.0 | 54.4 | 1.886 | 2.163 | 1.786 | 2.180 | 0.977 | 1.507 |
| 18 | 0.167 | 48.9 | 0.300 | 0.190 | 0.312 | 0.259 | 0.269 | 0.182 |
| 18 | 1.0 | 48.9 | 0.316 | 0.255 | 0.363 | 0.369 | 0.287 | 0.222 |
| 18 | 2.0 | 48.9 | 0.342 | 0.319 | 0.442 | 0.485 | 0.316 | 0.282 |
| 18 | 14.0 | 48.9 | 0.518 | 0.564 | 0.813 | 1.091 | 0.412 | 0.457 |
| 18 | 28.0 | 48.9 | 0.818 | 0.982 | 0.921 | 1.213 | 0.468 | 0.558 |
| 18 | 42.0 | 48.9 | 1.007 | 1.208 | 1.097 | 1.516 | 0.651 | 0.900 |
| 18 | 91.0 | 48.9 | 1.298 | 1.559 | 1.342 | 1.689 | 0.849 | 1.213 |
| 18 | 112.0 | 48.9 | 1.334 | 1.580 | 1.403 | 1.740 | 0.944 | 1.341 |
| 18 | 8.0 | 37.8 | 0.309 | 0.243 | 0.348 | 0.341 | 0.262 | 0.187 |
| 18 | 14.0 | 37.8 | 0.321 | 0.279 | 0.377 | 0.389 | 0.254 | 0.196 |
| 18 | 30.0 | 37.8 | 0.360 | 0.349 | 0.451 | 0.495 | 0.269 | 0.211 |
| 18 | 42.0 | 37.8 | 0.423 | 0.448 | 0.574 | 0.698 | 0.275 | 0.215 |
| 18 | 91.0 | 37.8 | 0.510 | 0.560 | 0.707 | 0.897 | 0.281 | 0.219 |
| 18 | 112.0 | 37.8 | 0.566 | 0.633 | 0.731 | 0.926 | 0.272 | 0.209 |
| 18 | 8.0 | 37.2 | 0.329 | 0.305 | 0.336 | 0.339 | 0.291 | 0.267 |
| 18 | 14.0 | 37.2 | 0.375 | 0.378 | 0.347 | 0.340 | 0.304 | 0.290 |
| 18 | 30.0 | 37.2 | 0.361 | 0.353 | 0.394 | 0.421 | 0.323 | 0.325 |
| 18 | 42.0 | 37.2 | 0.425 | 0.462 | 0.396 | 0.429 | 0.324 | 0.333 |
| 18 | 91.0 | 37.2 | 0.462 | 0.509 | 0.443 | 0.492 | 0.392 | 0.439 |
| 18 | 112.0 | 37.2 | 0.456 | 0.496 | 0.450 | 0.508 | 0.416 | 0.478 |
| 18 | 21.0 | 21.1 | 0.302 | 0.192 | 0.311 | 0.245 | 0.245 | 0.169 |

TABLE III-continued

Heat-Sealed Data at 15, 50 & 80% RH at 4.4° C. (40° F.), 21.1° C. (70° F.), 32.2° C. (90° F.), 37.8° C. (100° F.), 48.9° C. (120° F.), 54.4° C. (130° F.), and 60° C. (140° F.) in the visual and blue Status A densities only

| Part # | Time days | Temp deg C. | 15% RH visual | 15% RH blue | 50% RH visual | 50% RH blue | 80% RH visual | 80% RH blue |
|---|---|---|---|---|---|---|---|---|
| 18 | 30.0 | 21.1 | 0.305 | 0.189 | 0.320 | 0.263 | 0.249 | 0.178 |
| 18 | 42.0 | 21.1 | 0.289 | 0.217 | 0.313 | 0.273 | 0.244 | 0.172 |
| 18 | 91.0 | 21.1 | 0.305 | 0.198 | 0.322 | 0.270 | 0.249 | 0.169 |
| 18 | 112.0 | 21.1 | 0.308 | 0.207 | 0.328 | 0.286 | 0.253 | 0.177 |
| 18 | 14.0 | 4.4 | 0.313 | 0.224 | 0.317 | 0.251 | 0.274 | 0.228 |
| 18 | 42.0 | 4.4 | 0.318 | 0.238 | 0.315 | 0.266 | 0.279 | 0.245 |
| 18 | 91.0 | 4.4 | 0.317 | 0.209 | 0.321 | 0.247 | 0.291 | 0.248 |
| 18 | 112.0 | 4.4 | 0.318 | 0.216 | 0.320 | 0.239 | 0.288 | 0.230 |

The above data demonstrates that humidity may also have an effect on the thermal response of compositions used in accordance with the invention.

Figure 7:
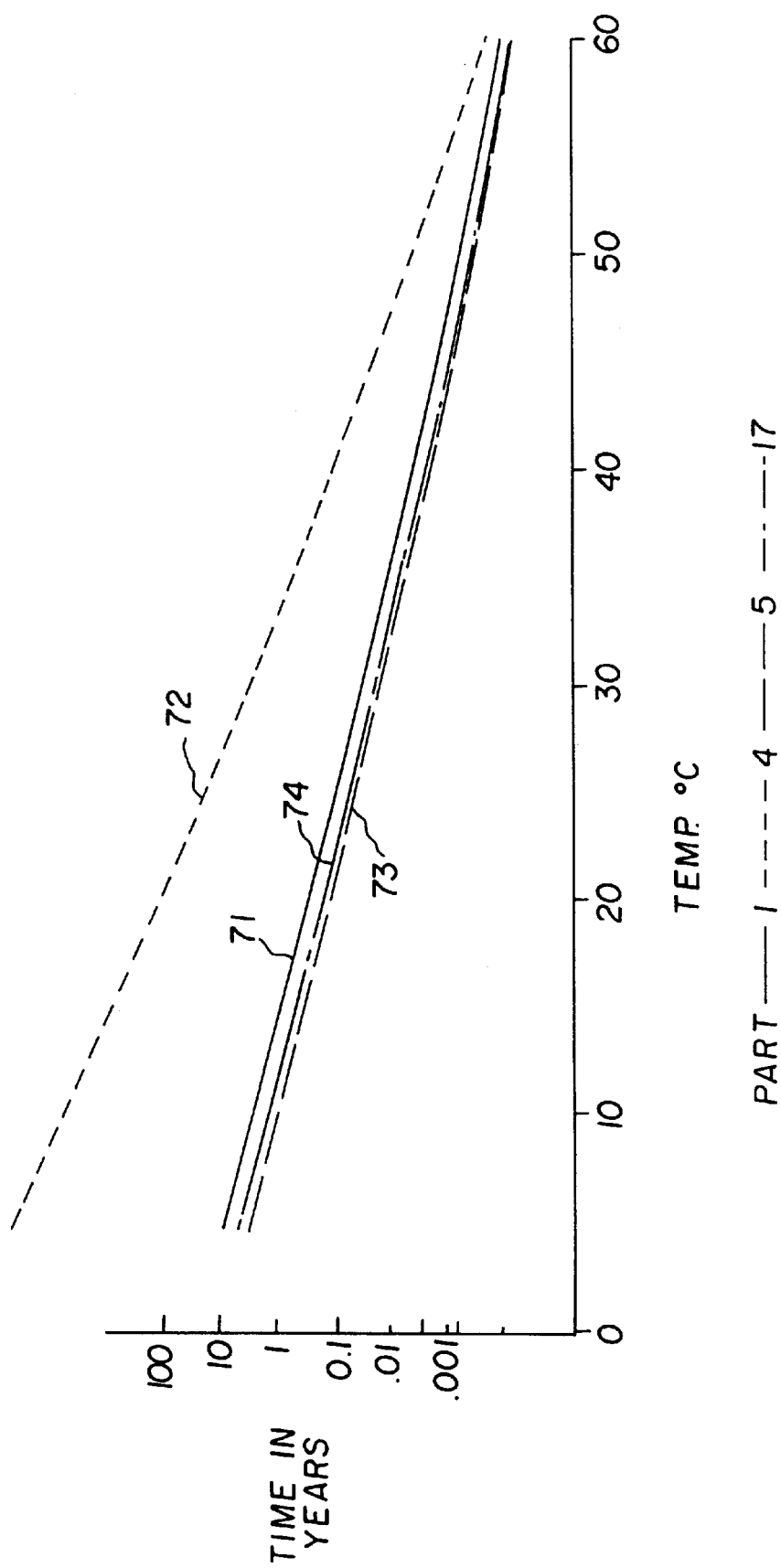
FIG. 7 illustrates predicted times required for a 0.1 density change in Status A Blue density upon keeping in heat sealed bags at 50% RH for Parts 1, 4, 5 and 17 of Example 1.

The Arrhenius relationship may be used to quantify the effect of temperature on many chemical and physical processes. To derive an Arrhenius estimation of predicted times required for a 0.1 density change in a thermally-sensitive image-forming composition used in a time and temperature integrating indicator device in accordance with the invention, the following method may be used. The length of time that it takes for the thermally sensitive composition to change by X density units (where X in this instance is 0.1) is determined at various temperatures. This is done by fitting a line to data which shows the density change for a particular composition as a function of time, such as indicated in Tables II and III above, and then interpolating to see at what time the X unit change occurs. The data is then plotted with the length of time indicated on the Y-axis with the inverse of the Kelvin temperature on the X-axis. A straight line is fitted to data by ordinary least squares regression, and this line then predicts the length of time for the particular density change (predicted life expectancy) at any given temperature. Predicted times required for a 0.1 density change in Status A Blue density upon keeping in heat sealed bags at 50% RH for Parts 1, 4, 5 and 17 described in Table I above were determined in this manner, and the results are illustrated in FIG. 7 (with the X-axis converted to indicate temperature in ° C. and the Y-axis indicating time in years on a log scale), with line 71 representing Part 1, line 72 representing Part 4, line 73 representing Part 5, and line 74 representing Part 17. As clearly seen from FIG. 7, formulations employed in indicator devices in accordance with the invention may be varied to obtain substantially different levels of thermal sensitivity.

Example 2

Thermally sensitive image-forming elements were prepared as in Example 1, except that different developers were additionally used. The example demonstrates the effect of two factors, namely: level of gold chemical sensitizer for the AgBr grains (0.00, 2.15, 4.31, or 6.46 mg/m2) and developer type (4-benzenesulfonamidophenol (BSAP) or n-propyl gallate). The layout of the Example is shown in Table IV.

TABLE IV

| Part # | Gold level (mg/m2) | Developer Type |
|---|---|---|
| 1 | 0.00 | BSAP |
| 2 | 2.15 | BSAP |
| 3 | 4.31 | BSAP |
| 4 | 6.46 | BSAP |
| 5 | 0.00 | n-propyl gallate |
| 6 | 2.15 | n-propyl gallate |
| 7 | 4.31 | n-propyl gallate |
| 8 | 6.46 | n-propyl gallate |

All of the parts in this example were similar to part #17 of Example 1 (laydown of 2422 mg Ag/m2, no antifoggant and no sensitizing dye). The molar amounts of both developers was held constant throughout this experiment. The resulting photothermographic compositions were coated at a wet laydown of 121.4 g/m2 on a poly(ethyleneterephthylate) film support. The coatings were dried at a temperature up to 77° C. for 2 minutes in an air chamber. All the coatings had the same overcoat as that described in Example 1.

"Free hung" samples were incubated and evaluated as described above, and the results are indicated in Table V:

TABLE V

FREE HUNG ONLY @ 21.1° C. (70° F.), 37.8° C. (100° F.) AND 60.0° C. (140° F.)/50% RH IN THE VISUAL AND BLUE STATUS A DENSITIES ONLY

| PART # | TIME DAYS | 21.1° C./50% RH VISUAL | 21.1° C./50% RH BLUE | 37.8° C./50% RH VISUAL | 37.8° C./50% RH BLUE | 60.0° C./50% RH VISUAL | 60.0° C./50% RH BLUE |
|---|---|---|---|---|---|---|---|
| 1 | 0 (RT) | 0.227 | 0.137 | 0.227 | 0.137 | 0.227 | 0.137 |
| 1 | 0.167 | . | . | . | . | 0.471 | 0.476 |
| 1 | 1 | 0.254 | 0.215 | 0.233 | 0.175 | 0.885 | 0.768 |
| 1 | 2 | 0.260 | 0.244 | 0.235 | 0.164 | 1.222 | 1.045 |
| 1 | 4 | 0.282 | 0.318 | 0.237 | 0.189 | 1.465 | 1.312 |
| 1 | 7 | 0.281 | 0.303 | 0.256 | 0.224 | 1.550 | 1.437 |
| 1 | 28 | 0.313 | 0.394 | 0.347 | 0.343 | 1.822 | 1.856 |
| 2 | 0 (RT) | 0.238 | 0.135 | 0.238 | 0.135 | 0.238 | 0.135 |
| 2 | 0.167 | . | . | . | . | 0.479 | 0.707 |
| 2 | 1 | 0.253 | 0.196 | 0.235 | 0.146 | 0.939 | 1.250 |
| 2 | 2 | 0.259 | 0.218 | 0.239 | 0.166 | 1.326 | 1.480 |
| 2 | 4 | 0.267 | 0.249 | 0.264 | 0.211 | 1.888 | 1.836 |
| 2 | 7 | 0.286 | 0.280 | 0.296 | 0.286 | 2.210 | 2.058 |
| 2 | 28 | 0.296 | 0.326 | 0.361 | 0.433 | 2.294 | 2.256 |
| 3 | 0 (RT) | 0.242 | 0.139 | 0.242 | 0.139 | 0.242 | 0.139 |
| 3 | 0.167 | . | . | . | . | 0.593 | 0.880 |
| 3 | 1 | 0.262 | 0.205 | 0.244 | 0.155 | 0.970 | 1.389 |
| 3 | 2 | 0.267 | 0.223 | 0.254 | 0.188 | 1.527 | 1.775 |

TABLE V-continued

FREE HUNG ONLY @ 21.1° C. (70° F.), 37.8° C. (100° F.) AND 60.0° C. (140° F.)/50% RH IN THE VISUAL AND BLUE STATUS A DENSITIES ONLY

| | TIME | 21.1° C./50% RH | | 37.8° C./50% RH | | 60.0° C./50% RH | |
|---|---|---|---|---|---|---|---|
| PART # | DAYS | VISUAL | BLUE | VISUAL | BLUE | VISUAL | BLUE |
| 3 | 4 | 0.280 | 0.259 | 0.286 | 0.230 | 2.153 | 2.117 |
| 3 | 7 | 0.294 | 0.277 | 0.326 | 0.318 | 2.265 | 2.168 |
| 3 | 28 | 0.316 | 0.328 | 0.456 | 0.604 | 2.677 | 2.506 |
| 4 | 0 (RT) | 0.242 | 0.132 | 0.242 | 0.132 | 0.242 | 0.132 |
| 4 | 0.167 | . | . | . | . | 0.750 | 1.059 |
| 4 | 1 | 0.254 | 0.179 | 0.261 | 0.177 | 1.459 | 1.887 |
| 4 | 2 | 0.255 | 0.182 | 0.265 | 0.195 | 1.928 | 2.140 |
| 4 | 4 | 0.274 | 0.219 | 0.340 | 0.288 | 2.384 | 2.366 |
| 4 | 7 | 0.279 | 0.225 | 0.381 | 0.346 | 2.647 | 2.435 |
| 4 | 28 | 0.304 | 0.270 | 0.643 | 0.662 | 2.995 | 2.712 |
| 5 | 0 (RT) | 0.304 | 0.251 | 0.304 | 0.251 | 0.304 | 0.251 |
| 5 | 0.167 | . | . | . | . | 1.722 | 2.669 |
| 5 | 1 | 0.326 | 0.315 | 0.453 | 0.469 | 1.985 | 3.343 |
| 5 | 2 | 0.338 | 0.339 | 0.485 | 0.563 | 2.0$0 | 3.626 |
| 5 | 4 | 0.381 | 0.408 | 0.513 | 0.690 | 2.142 | 3.876 |
| 5 | 7 | 0.377 | 0.394 | 0.508 | 0.782 | 2.224 | 4.078 |
| 5 | 28 | 0.425 | 0.481 | 0.583 | 1.062 | 2.326 | 4.427 |
| 6 | 0 (RT) | 0.413 | 0.367 | 0.413 | 0.367 | 0.413 | 0.367 |
| 6 | 0.167 | . | . | . | . | 0.952 | 1.772 |
| 6 | 1 | 0.376 | 0.394 | 0.428 | 0.445 | 1.349 | 2.552 |
| 6 | 2 | 0.411 | 0.455 | 0.461 | 0.506 | 1.487 | 2.829 |
| 6 | 4 | 0.399 | 0.455 | 0.469 | 0.569 | 1.636 | 3.147 |
| 6 | 7 | 0.430 | 0.490 | 0.505 | 0.668 | 1.717 | 3.313 |
| 6 | 28 | 0.413 | 0.479 | 0.510 | 0.834 | 1.882 | 3.679 |
| 7 | 0 (RT) | 0.422 | 0.466 | 0.422 | 0.466 | 0.422 | 0.466 |
| 7 | 0.167 | . | . | . | . | 1.184 | 2.203 |
| 7 | 1 | 0.408 | 0.519 | 0.431 | 0.415 | 1.469 | 2.866 |
| 7 | 2 | 0.408 | 0.508 | 0.471 | 0.493 | 1.502 | 2.998 |
| 7 | 4 | 0.420 | 0.535 | 0.440 | 0.491 | 1.689 | 3.367 |
| 7 | 7 | 0.435 | 0.535 | 0.481 | 0.599 | 1.517 | 3.135 |
| 7 | 28 | 0.412 | 0.496 | 0.521 | 0.803 | 1.731 | 3.543 |
| 8 | 0 (RT) | 0.250 | 0.215 | 0.250 | 0.215 | 0.250 | 0.215 |
| 8 | 0.167 | . | . | . | . | 0.465 | 0.785 |
| 8 | 1 | 0.260 | 0.223 | 0.328 | 0.379 | 0.652 | 1.237 |
| 8 | 2 | 0.262 | 0.232 | 0.297 | 0.325 | 0.817 | 1.518 |
| 8 | 4 | 0.262 | 0.250 | 0.318 | 0.371 | 0.998 | 1.733 |
| 8 | 7 | 0.277 | 0.279 | 0.338 | 0.421 | 1.110 | 1.888 |
| 8 | 28 | 0.296 | 0.290 | 0.369 | 0.518 | 1.249 | 2.009 |

The above data demonstrates that choice of reducing agent (developer) may also be used to vary the responses in combination with other component materials in thermosensitive compositions used in accordance with the invention.

Example 3

Thermally sensitive image-forming elements were prepared by coating the following thermographic composition at a wet laydown of 70.0 g/m2 (6.50 g/ft2) on a poly(ethyleneterephthalate) film support:

| Thermographic Composition Component | Grams |
|---|---|
| Silver behenate dispersion (contains 18.0% by weight silver behenate in 4.0% by weight acetone/toluene solution of polyvinylbutyral (Butvar B-76 which is a trademark of and available from Monsanto Co., USA) | 33.45 |
| A 10% by weight solution of polyvinylacetal (mol. weight 338,000 g/mole, from Sekisui Co.) in methyl ethyl ketone. | 48.46 |
| A 10% by weight solution of B-76 Butvar in methyl ethyl ketone | 4.56 |
| Dry n-propyl gallate developer | 1.23 |
| A 10% by weight solution of succinimide in a 50/50 mixture of acetone/methyl ethyl ketone | 12.31 |
| | 100.0 g |

The coating was dried at a temperature up to 77° C. for 2 minutes in an air chamber and was then overcoated with a 2.8% by weight solution of polyvinylacetal (mol. weight 100,000 g/mole, from Sekisui Co.) in methylethyl ketone at a wet laydown of 34.8 g/m2 (3.23 g/ft2). The coating was permitted to dry at a temperature up to 77° C. for 2 minutes in an air chamber.

"Free hung" samples were incubated and evaluated as described above, and the results are indicated in Table VI:

TABLE VI

Free-Hung Data at 21.1° C. (70° F.), 32.2° C. (90° F.), 37.8° C. (100° F.), 43.3° C. (110° F.), 48.9° C. (120° F.), 54.4° C. (130° F.), and 60° C. (140° F.) in the visual and blue, green and red Status A Delta-Density Data

| Inc Temp ° C. | Inc Time (hours) | Transmission Status A Density Values | | | |
|---|---|---|---|---|---|
| | | Visual | Red | Green | Blue |
| 21.1 | 17 | 0.152 | 0.178 | 0.108 | 0.061 |
| 21.1 | 89 | 0.144 | 0.169 | 0.100 | 0.055 |
| 21.1 | 161 | 0.145 | 0.173 | 0.100 | 0.050 |
| 21.1 | 329 | 0.144 | 0.170 | 0.099 | 0.050 |
| 21.1 | 497 | 0.149 | 0.175 | 0.100 | 0.054 |
| 21.1 | 665 | 0.143 | 0.168 | 0.096 | 0.051 |
| 32.2 | 17 | 0.158 | 0.179 | 0.119 | 0.083 |
| 32.2 | 89 | 0.158 | 0.179 | 0.118 | 0.087 |
| 32.2 | 161 | 0.156 | 0.177 | 0.111 | 0.086 |

TABLE VI-continued

Free-Hung Data at 21.1° C. (70° F.), 32.2° C. (90° F.), 37.8° C. (100° F.), 43.3° C. (110° F.), 48.9° C. (120° F.), 54.4° C. (130° F.), and 60° C. (140° F.) in the visual and blue, green and red Status A Delta-Density Data

| Inc Temp ° C. | Inc Time (hours) | Transmission Status A Density Values | | | |
|---|---|---|---|---|---|
| | | Visual | Red | Green | Blue |
| 32.2 | 329 | 0.154 | 0.175 | 0.114 | 0.094 |
| 32.2 | 497 | 0.162 | 0.183 | 0.116 | 0.098 |
| 32.2 | 665 | 0.150 | 0.170 | 0.107 | 0.090 |
| 37.8 | 17 | 0.151 | 0.176 | 0.108 | 0.063 |
| 37.8 | 89 | 0.151 | 0.178 | 0.106 | 0.062 |
| 37.8 | 161 | 0.148 | 0.177 | 0.102 | 0.056 |
| 37.8 | 329 | 0.147 | 0.172 | 0.102 | 0.061 |
| 37.8 | 497 | 0.154 | 0.180 | 0.104 | 0.061 |
| 37.8 | 665 | 0.147 | 0.170 | 0.101 | 0.062 |
| 43.3 | 17 | 0.148 | 0.172 | 0.105 | 0.062 |
| 43.3 | 89 | 0.149 | 0.176 | 0.105 | 0.064 |
| 43.3 | 161 | 0.148 | 0.172 | 0.103 | 0.063 |
| 43.3 | 329 | 0.145 | 0.169 | 0.101 | 0.065 |
| 43.3 | 497 | 0.153 | 0.179 | 0.102 | 0.064 |
| 43.3 | 665 | 0.145 | 0.167 | 0.101 | 0.069 |
| 48.9 | 17 | 0.149 | 0.171 | 0.108 | 0.068 |
| 48.9 | 89 | 0.149 | 0.176 | 0.108 | 0.070 |
| 48.9 | 161 | 0.153 | 0.176 | 0.117 | 0.088 |
| 48.9 | 329 | 0.151 | 0.172 | 0.111 | 0.090 |
| 48.9 | 497 | 0.158 | 0.180 | 0.113 | 0.091 |
| 48.9 | 665 | 0.154 | 0.173 | 0.112 | 0.095 |
| 54.4 | 17 | 0.151 | 0.173 | 0.109 | 0.069 |
| 54.4 | 89 | 0.152 | 0.177 | 0.115 | 0.079 |
| 54.4 | 161 | 0.154 | 0.181 | 0.114 | 0.084 |
| 54.4 | 329 | 0.158 | 0.177 | 0.118 | 0.106 |
| 54.4 | 497 | 0.182 | 0.198 | 0.143 | 0.144 |
| 54.4 | 665 | 0.208 | 0.211 | 0.176 | 0.203 |
| 60.0 | 17 | 0.175 | 0.188 | 0.142 | 0.134 |
| 60.0 | 89 | 0.255 | 0.245 | 0.246 | 0.293 |
| 60.0 | 161 | 0.327 | 0.303 | 0.329 | 0.392 |
| 60.0 | 329 | 0.493 | 0.435 | 0.516 | 0.608 |
| 60.0 | 497 | 0.627 | 0.558 | 0.651 | 0.749 |

Example 4

Thermally sensitive image-forming elements were prepared by coating the following thermographic composition at a wet laydown of 69.8 g/m2 (6.48 g/ft2) on a poly (ethyleneterephthalate) film support:

| Thermographic Composition Component | Grams |
|---|---|
| Silver behenate dispersion (contains 23.4% by weight silver behenate in 5.0% by weight methyl ethyl ketone/toluene solution of polyvinylbutyral, Butvar B-76) | 26.40 |
| A 10% by weight solution of polyvinylacetal (mol. weight 338,000 g/mole, from Sekisui Co.) in methyl ethyl ketone | 35.60 |
| Methyl ethyl ketone | 16.50 |
| 3,6-dibromo-4-benzenesulfonamidophenol developer | 1.23 |
| A 7% by weight solution of L-ascorbic acid, 6-palmitate developer in a mixture of methanol/methyl ethyl ketone/polyvinylacetone (7/77/9) | 17.60 |
| A 10% solution by weight of DC-510 surfactant solution in toluene (DC-510 is a trademark of and available from Dow Corning Co.) | 1.50 |
| Dry succinimide development accelerator | 1.23 |
| | 100.0 g |

The coating was dried at a temperature up to 77° C. for 2 minutes in an air chamber, and coated with a polyvinylacetal overcoat as in Example 3 above.

"Free hung" samples were incubated and evaluated as described above, and the results are indicated in Table VII:

TABLE VII

Free-Hung Data at 21.1° C. (70° F.), 32.2° C. (90° F.), 37.8° C. (100° F.), 43.3° C. (110° F.), 48.9° C. (120° F.), 54.4° C. (130° F.), and 60° C. (140° F.) in the visual and blue, green and red Status A Delta-Density Data

| Inc Temp ° C. | Inc Time (hours) | Transmission Status A Density Values | | | |
|---|---|---|---|---|---|
| | | Visual | Red | Green | Blue |
| 21.1 | 17 | 0.182 | 0.213 | 0.126 | 0.098 |
| 21.1 | 89 | 0.177 | 0.210 | 0.127 | 0.094 |
| 21.1 | 161 | 0.179 | 0.215 | 0.124 | 0.095 |
| 21.1 | 329 | 0.175 | 0.207 | 0.118 | 0.086 |
| 21.1 | 497 | 0.186 | 0.219 | 0.126 | 0.109 |
| 21.1 | 665 | 0.179 | 0.209 | 0.122 | 0.111 |
| 32.2 | 17 | 0.219 | 0.240 | 0.172 | 0.213 |
| 32.2 | 89 | 0.230 | 0.250 | 0.188 | 0.251 |
| 32.2 | 161 | 0.236 | 0.251 | 0.194 | 0.295 |
| 32.2 | 329 | 0.232 | 0.252 | 0.181 | 0.256 |
| 32.2 | 497 | 0.248 | 0.262 | 0.201 | 0.318 |
| 32.2 | 665 | 0.239 | 0.252 | 0.198 | 0.310 |
| 37.8 | 17 | 0.183 | 0.210 | 0.131 | 0.132 |
| 37.8 | 89 | 0.186 | 0.216 | 0.138 | 0.158 |
| 37.8 | 161 | 0.186 | 0.213 | 0.131 | 0.170 |
| 37.8 | 329 | 0.191 | 0.215 | 0.141 | 0.217 |
| 37.8 | 497 | 0.200 | 0.224 | 0.146 | 0.239 |
| 37.8 | 665 | 0.195 | 0.218 | 0.142 | 0.249 |
| 43.3 | 17 | 0.188 | 0.214 | 0.135 | 0.147 |
| 43.3 | 89 | 0.199 | 0.224 | 0.156 | 0.217 |
| 43.3 | 161 | 0.206 | 0.226 | 0.158 | 0.260 |
| 43.3 | 329 | 0.211 | 0.227 | 0.167 | 0.324 |
| 43.3 | 497 | 0.224 | 0.238 | 0.178 | 0.360 |
| 43.3 | 665 | 0.222 | 0.232 | 0.181 | 0.383 |
| 48.9 | 17 | 0.226 | 0.242 | 0.184 | 0.283 |
| 48.9 | 89 | 0.264 | 0.268 | 0.238 | 0.448 |
| 48.9 | 161 | 0.592 | 0.564 | 0.600 | 0.911 |
| 54.4 | 4 | 0.395 | 0.401 | 0.361 | 0.448 |
| 54.4 | 76 | 0.578 | 0.557 | 0.576 | 0.800 |
| 54.4 | 148 | 0.595 | 0.575 | 0.593 | 0.843 |
| 60.0 | 4 | 1.395 | 1.426 | 1.336 | 1.290 |

"Heat-Sealed bag" samples were also incubated and evaluated as described above, and the results are indicated in Table VIII:

TABLE VIII

Heat-Sealed Data at 15, 50 & 80% RH at 21.1° C. (70° F.), 32.2° C. (90° F.), 37.8° C. (100° F.), 48.9° C. (120° F.), 54.4° F. (130° F.), and 60° C. (140° F.) in the visual and blue, green and red Status A Delta-Density Data

| Inc. Temp C. | % RH | Inc Time (hours) | Transmission Status A Density Values | | | |
|---|---|---|---|---|---|---|
| | | | Visual | Red | Green | Blue |
| 21.1 | 50 | 4 | 0.175 | 0.207 | 0.120 | 0.085 |
| 21.1 | 50 | 24 | 0.175 | 0.206 | 0.118 | 0.091 |
| 21.1 | 50 | 72 | 0.176 | 0.206 | 0.119 | 0.090 |
| 21.1 | 50 | 168 | 0.174 | 0.204 | 0.117 | 0.090 |
| 60.0 | 15 | 4 | 0.314 | 0.322 | 0.279 | 0.387 |
| 60.0 | 15 | 24 | 0.506 | 0.479 | 0.505 | 0.789 |
| 60.0 | 15 | 72 | 0.755 | 0.655 | 0.830 | 1.443 |
| 60.0 | 15 | 168 | 0.779 | 0.666 | 0.867 | 1.538 |
| 60.0 | 15 | 336 | 0.837 | 0.688 | 0.958 | 1.675 |
| 60.0 | 50 | 4 | 1.066 | 1.080 | 1.022 | 1.047 |
| 60.0 | 50 | 24 | 1.137 | 1.135 | 1.105 | 1.201 |
| 60.0 | 50 | 72 | 1.451 | 1.390 | 1.473 | 1.699 |
| 60.0 | 50 | 168 | 1.601 | 1.518 | 1.639 | 1.865 |
| 60.0 | 50 | 336 | 1.533 | 1.446 | 1.570 | 1.806 |
| 60.0 | 80 | 4 | 1.508 | 1.536 | 1.451 | 1.421 |
| 60.0 | 80 | 24 | 1.818 | 1.817 | 1.787 | 1.824 |
| 60.0 | 80 | 72 | 1.745 | 1.689 | 1.756 | 1.883 |
| 60.0 | 80 | 168 | 1.793 | 1.716 | 1.820 | 1.975 |
| 60.0 | 80 | 336 | 1.994 | 1.896 | 2.049 | 2.234 |

TABLE VIII-continued

Heat-Sealed Data at 15, 50 & 80% RH at 21.1° C. (70° F.), 32.2° C. (90° F.), 37.8° C. (100° F.), 48.9° C. (120° F.), 54.4° F. (130° F.), and 60° C. (140° F.) in the visual and blue, green and red Status A Delta-Density Data

| Inc. Temp C. | % RH | Inc Time (hours) | Visual | Red | Green | Blue |
|---|---|---|---|---|---|---|
| 54.4 | 15 | 4 | . | . | . | . |
| 54.4 | 15 | 24 | 0.269 | 0.271 | 0.239 | 0.419 |
| 54.4 | 15 | 72 | 0.330 | 0.309 | 0.322 | 0.673 |
| 54.4 | 15 | 168 | 0.356 | 0.325 | 0.360 | 0.798 |
| 54.4 | 15 | 336 | 0.364 | 0.329 | 0.374 | 0.853 |
| 54.4 | 50 | 4 | . | . | . | . |
| 54.4 | 50 | 24 | 0.584 | 0.571 | 0.563 | 0.721 |
| 54.4 | 50 | 72 | 0.611 | 0.588 | 0.600 | 0.797 |
| 54.4 | 50 | 168 | 0.646 | 0.618 | 0.641 | 0.912 |
| 54.4 | 50 | 336 | 0.671 | 0.633 | 0.674 | 0.980 |
| 54.4 | 80 | 4 | . | . | . | . |
| 54.4 | 80 | 24 | 1.419 | 1.431 | 1.372 | 1.356 |
| 54.4 | 80 | 72 | 1.905 | 1.876 | 1.892 | 1.963 |
| 54.4 | 80 | 168 | 1.766 | 1.733 | 1.752 | 1.831 |
| 54.4 | 80 | 336 | 1.983 | 1.925 | 1.994 | 2.102 |
| 48.9 | 15 | 24 | 0.185 | 0.212 | 0.129 | 0.124 |
| 48.9 | 15 | 72 | 0.184 | 0.210 | 0.131 | 0.164 |
| 48.9 | 15 | 168 | 0.189 | 0.212 | 0.138 | 0.205 |
| 48.9 | 15 | 336 | 0.190 | 0.212 | 0.142 | 0.228 |
| 48.9 | 50 | 24 | 0.210 | 0.229 | 0.163 | 0.258 |
| 48.9 | 50 | 72 | 0.225 | 0.236 | 0.186 | 0.352 |
| 48.9 | 50 | 168 | 0.248 | 0.252 | 0.215 | 0.453 |
| 48.9 | 50 | 336 | 0.263 | 0.260 | 0.237 | 0.540 |
| 48.9 | 80 | 24 | 0.314 | 0.317 | 0.282 | 0.428 |
| 48.9 | 80 | 72 | 0.351 | 0.343 | 0.328 | 0.538 |
| 48.9 | 80 | 168 | 0.329 | 0.325 | 0.299 | 0.497 |
| 48.9 | 80 | 336 | 0.376 | 0.361 | 0.361 | 0.631 |
| 43.3 | 15 | 168 | 0.179 | 0.207 | 0.123 | 0.119 |
| 43.3 | 15 | 336 | 0.187 | 0.215 | 0.134 | 0.141 |
| 43.3 | 50 | 168 | 0.207 | 0.224 | 0.163 | 0.297 |
| 43.3 | 50 | 336 | 0.206 | 0.223 | 0.163 | 0.309 |
| 43.3 | 80 | 168 | 0.288 | 0.291 | 0.257 | 0.426 |
| 43.3 | 80 | 336 | 0.304 | 0.303 | 0.275 | 0.465 |
| 37.8 | 15 | 168 | 0.176 | 0.206 | 0.120 | 0.094 |
| 37.8 | 15 | 336 | 0.175 | 0.204 | 0.119 | 0.097 |
| 37.8 | 50 | 168 | 0.182 | 0.209 | 0.128 | 0.156 |
| 37.8 | 50 | 336 | 0.181 | 0.208 | 0.129 | 0.164 |
| 37.8 | 80 | 168 | 0.222 | 0.236 | 0.178 | 0.305 |
| 37.8 | 80 | 336 | 0.223 | 0.237 | 0.182 | 0.322 |
| 32.2 | 15 | 168 | 0.175 | 0.205 | 0.118 | 0.086 |
| 32.2 | 15 | 336 | 0.176 | 0.206 | 0.118 | 0.089 |
| 32.2 | 50 | 168 | 0.178 | 0.209 | 0.121 | 0.119 |
| 32.2 | 50 | 336 | 0.186 | 0.211 | 0.135 | 0.202 |
| 32.2 | 80 | 168 | 0.203 | 0.222 | 0.154 | 0.272 |
| 32.2 | 80 | 336 | 0.206 | 0.224 | 0.158 | 0.291 |

The above data demonstrates that devices in accordance with the invention may be formulated which result in greater density increases at higher relative humidities, and thus may function as integrated time, temperature and humidity exposure indicators.

In the above examples, various thermally sensitive composition formulations are demonstrated to exhibit substantial density changes as a function of cumulative thermal exposure. Such compositions may be used to form or obscure indicating indicia in a time and temperature integrating indicator device in accordance with the invention. The invention has been described in detail, with particular reference to certain preferred embodiments thereof, but it should be understood that variations and modifications can be effected within the spirit and scope of the invention.

What is claimed is:

1. A time and temperature integrating device for providing a visually observable indication of cumulative thermal exposure comprising
    (a) a substrate having thereon an area comprising a thermally sensitive image-forming composition comprising a combination of (i) an organic silver salt oxidizing agent and (ii) a reducing agent for the organic silver salt oxidizing agent, which image-forming composition exhibits a visual change in response to thermal exposures, the visual change being correlated to known levels of time and temperature integrated thermal exposure and
    (b) indicating indicia in association with the thermally sensitive area for indicating when the device has been exposed to a predetermined level of cumulative thermal exposure;

wherein the thermally sensitive image-forming composition comprises total silver metal coverage of from 0.1 to 10 $g/m^2$.

2. A device according to claim 1, wherein the total silver metal coverage is at least 2.0 g/m2.

3. A device according to claim 1, wherein the organic silver salt comprises a silver salt of a long chain fatty acid.

4. A device according to claim 1, wherein the organic silver salt comprises silver behenate.

5. A time and temperature integrating device for providing a visually observable indication of cumulative thermal exposure comprising
    (a) a substrate having thereon an area comprising a thermally sensitive image-forming composition comprising a combination of (i) an organic silver salt oxidizing agent and (ii) a reducing agent for the organic silver salt oxidizing agent, which image-forming composition exhibits a visual change in response to thermal exposures, the visual change being correlated to known levels of time and temperature integrated thermal exposure and
    (b) indicating indicia in association with the thermally sensitive area for indicating when the device has been exposed to a predetermined level of cumulative thermal exposure;

wherein the organic silver salt comprises silver behenate and the reducing agent comprises ascorbic acid or a derivative thereof.

6. A device according to claim 5, wherein the reducing agent comprises ascorbic acid palmitate.

7. A time and temperature integrating device for providing a visually observable indication of cumulative thermal exposure comprising
    (a) a substrate having thereon an area comprising a thermally sensitive image-forming composition comprising a combination of (i) an organic silver salt oxidizing agent and (ii) a reducing agent for the organic silver salt oxidizing agent, which image-forming composition exhibits a visual change in response to thermal exposures, the visual change being correlated to known levels of time and temperature integrated thermal exposure and
    (b) indicating indicia in association with the thermally sensitive area for indicating when the device has been exposed to a predetermined level of cumulative thermal exposure;

wherein the organic silver salt comprises silver behenate and the reducing agent comprises a polyhydroxybenzene compound.

8. A device according to claim 7, wherein the reducing agent comprises gallic acid or a derivative thereof.

9. A device according to claim 8, wherein the reducing agent comprises propyl gallate.

10. A time and temperature integrating device for providing a visually observable indication of cumulative thermal exposure comprising (a) a substrate having thereon an area comprising a thermally sensitive image-forming composition comprising a combination of (i) an organic silver salt oxidizing agent and (ii) a reducing agent for the organic silver salt oxidizing agent, which image-forming composition exhibits a visual change in response to thermal exposures, the visual change being correlated to known levels of time and temperature integrated thermal exposure and (b) indicating indicia in association with the thermally sensitive area for indicating when the device has been exposed to a predetermined level of cumulative thermal exposure;

wherein the organic silver salt comprises silver behenate and the reducing agent comprises a sulfonamidophenol compound.

11. A device according to claim 10, wherein the reducing agent comprises a benzenesulfonamidophenol compound.

12. A device according to claim 1, further comprising a protective overcoat layer.

13. A time and temperature integrating device for providing a visually observable indication of cumulative thermal exposure comprising (a) a substrate having thereon an area comprising a thermally sensitive image-forming composition comprising a combination of (i) an organic silver salt oxidizing agent and (ii) a reducing agent for the organic silver salt oxidizing agent, which image-forming composition exhibits a visual change in response to thermal exposures, the visual change being correlated to known levels of time and temperature integrated thermal exposure and (b) indicating indicia in association with the thermally sensitive area for indicating when the device has been exposed to a predetermined level of cumulative thermal exposure;

wherein the thermally sensitive image-forming composition comprises a photosensitive silver salt and a non-photosensitive organic silver salt.

14. A device according to claim 13, wherein the photosensitive silver salt comprises a silver halide.

15. A device according to claim 13, wherein the thermally sensitive image-forming composition comprises total silver metal coverage of from 0.1 to 10 g/m2.

16. A device according to claim 15, wherein the total silver metal coverage is at least 2.0 g/m2.

17. A device according to claim 13, wherein the photosensitive silver salt is not sensitized with a spectrally sensitizing dye.

18. A device according to claim 13, wherein the photosensitive silver salt is chemically sensitized with a gold sensitizer compound.

19. A device according to claim 18, wherein the gold sensitizer is present at from 0.1 to 8.0 mg/m2.

20. A device according to claim 13, wherein the thermally sensitive image-forming composition is substantially free of antifoggant and thermal stabilizer compounds.

21. A time and temperature integrating device for providing a visually observable indication of cumulative thermal exposure comprising (a) a substrate having thereon an area comprising a thermally sensitive image-forming composition comprising a combination of (i) an organic silver salt oxidizing agent and (ii) a reducing agent for the organic silver salt oxidizing agent, which image-forming composition exhibits a visual change in response to thermal exposures, the visual change being correlated to known levels of time and temperature integrated thermal exposure and (b) indicating indicia in association with the thermally sensitive area for indicating when the device has been exposed to a predetermined level of cumulative thermal exposure;

wherein the thermally sensitive image-forming composition is substantially free of antifoggant and thermal stabilizer compounds.

22. A time and temperature integrating device for providing a visually observable indication of cumulative thermal exposure comprising (a) a substrate having thereon an area comprising a thermally sensitive image-forming composition comprising a combination of (i) an organic silver salt oxidizing agent and (ii) a reducing agent for the organic silver salt oxidizing agent, which image-forming composition exhibits a visual change in response to thermal exposures, the visual change being correlated to known levels of time and temperature integrated thermal exposure and (b) indicating indicia in association with the thermally sensitive area for indicating when the device has been exposed to a predetermined level of cumulative thermal exposure;

wherein the indicating indicia comprises letters or graphics printed on the device which become obscured by an image formed by the thermally sensitive composition when the device has been exposed to a predetermined level of cumulative thermal exposure.

23. A device according to claim 22, wherein the indicating indicia comprises a bar code.

24. A time and temperature integrating device for providing a visually observable indication of cumulative thermal exposure comprising (a) a substrate having thereon an area comprising a thermally sensitive image-forming composition comprising a combination of (i) an organic silver salt oxidizing agent and (ii) a reducing agent for the organic silver salt oxidizing agent, which image-forming composition exhibits a visual change in response to thermal exposures, the visual change being correlated to known levels of time and temperature integrated thermal exposure and (b) indicating indicia in association with the thermally sensitive area for indicating when the device has been exposed to a predetermined level of cumulative thermal exposure;

wherein the indicating indicia comprises latent indicia which is not visually observable until the device has been exposed to a predetermined level of cumulative thermal exposure.

25. A process comprising applying to a perishable product or to packaging thereof a time and temperature indicating device for providing a visually observable indication of cumulative thermal exposure, wherein the time and temperature integrating device comprises a substrate having thereon an area comprising a thermally sensitive image-forming composition comprising a combination of (i) an organic silver salt oxidizing agent and (ii) a reducing agent for the organic silver salt oxidizing agent, which image-forming composition exhibits a visual change in response to thermal exposures, the visual change being correlated to known levels of time and temperature integrated thermal exposure, and wherein the perishable product, its packaging, or the time and temperature integrating device includes indicating indicia in association with the thermally sensitive area for indicating when the perishable product has been exposed to a predetermined level of cumulative thermal exposure;

wherein the thermally sensitive image-forming composition comprises total silver metal coverage of from 0.1 to 10 g/m$^2$.

26. A perishable product having applied directly thereto or to packaging thereof a time and temperature integrating device for providing a visually observable indication of cumulative thermal exposure, wherein the time and temperature integrating device comprises a substrate having thereon an area comprising a thermally sensitive image-forming composition comprising a combination of (i) an organic silver salt oxidizing agent and (ii) a reducing agent for the organic silver salt oxidizing agent, which image-forming composition exhibits a visual change in response to thermal exposures, the visual change being correlated to known levels of time and temperature integrated thermal exposure, and wherein the perishable product, its packaging, or the time and temperature integrating device includes indicating indicia in association with the thermally sensitive area for indicating when the perish able product has been exposed to a predetermined level of cumulative thermal exposure;

wherein the thermally sensitive image-forming composition comprises total silver metal coverage of from 0.1 to 10 g/m$^2$.

* * * * *